(12) United States Patent
Pugh et al.

(10) Patent No.: US 10,345,620 B2
(45) Date of Patent: *Jul. 9, 2019

(54) METHODS AND APPARATUS TO FORM BIOCOMPATIBLE ENERGIZATION ELEMENTS INCORPORATING FUEL CELLS FOR BIOMEDICAL DEVICES

(71) Applicant: Johnson & Johnson Vision Care, Inc., Jacksonville, FL (US)

(72) Inventors: Randall B. Pugh, St. Johns, FL (US); Sharika Snook, St. Augustine, FL (US); Adam Toner, Jacksonville, FL (US); Frederick A. Flitsch, New Windsor, NY (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/047,009

(22) Filed: Feb. 18, 2016

(65) Prior Publication Data
US 2017/0242271 A1 Aug. 24, 2017

(51) Int. Cl.
*G02C 7/08* (2006.01)
*H01M 4/90* (2006.01)
(Continued)

(52) U.S. Cl.
CPC .............. *G02C 7/083* (2013.01); *G02C 7/04* (2013.01); *H01M 4/9008* (2013.01); *H01M 8/0256* (2013.01); *H01M 8/0271* (2013.01); *H01M 8/0276* (2013.01); *H01M 8/0284* (2013.01); *H01M 8/0286* (2013.01); *H01M 8/16* (2013.01);
(Continued)

(58) Field of Classification Search
CPC ........ H01M 8/16; H01M 2/18; H01M 2/1653; H01M 2/145; H01M 4/5825; H01M 4/622; H01M 4/625; H01M 10/058; H01M 10/0569; H01M 10/0568; H01M 10/0525;
(Continued)

(56) References Cited

U.S. PATENT DOCUMENTS 754,804 A 3/1904 Pratt
787,657 A 4/1905 Quimby
(Continued)

FOREIGN PATENT DOCUMENTS

AR 073391 A1 11/2010
AR 073742 A1 12/2010
(Continued)

OTHER PUBLICATIONS

Benefits of PVC (Year: 2018), 1 page.
(Continued)

*Primary Examiner* — Stewart A Fraser
*Assistant Examiner* — Rachel L Zhang

(57) ABSTRACT

Methods and apparatus to form biocompatible energization elements are described. In some embodiments, the methods and apparatus to form the biocompatible energization elements involve forming cavities into a fuel cell. The active elements of a cathode, anode, membrane and fuel storage are sealed with a laminate stack of biocompatible material. In some embodiments, a field of use for the methods and apparatus may include any biocompatible device or product that requires energization elements.

34 Claims, 15 Drawing Sheets

(51) Int. Cl.
- *G02C 7/04* (2006.01)
- *H01M 8/0284* (2016.01)
- *H01M 8/0286* (2016.01)
- *H01M 8/0256* (2016.01)
- *H01M 8/16* (2006.01)
- *H01M 8/0271* (2016.01)
- *H01M 8/0276* (2016.01)
- *H01M 4/86* (2006.01)

(52) U.S. Cl.
CPC ...... H01M 4/86 (2013.01); H01M 2004/8684 (2013.01); H01M 2250/30 (2013.01); Y02B 90/18 (2013.01); Y02E 60/527 (2013.01); Y02P 70/56 (2015.11)

(58) Field of Classification Search
CPC ......... A61L 31/06; A61L 31/145; G02C 7/04; G02C 7/083
See application file for complete search history.

(56) References Cited

U.S. PATENT DOCUMENTS

| | | |
|---|---|---|
| 1,390,765 A | 9/1921 | Cox |
| 1,559,562 A | 11/1925 | Edison |
| 2,871,281 A | 1/1959 | Moulton et al. |
| 2,991,324 A | 7/1961 | Vogt |
| 3,291,296 A | 12/1966 | Lemkelde |
| 3,306,776 A | 2/1967 | Tamminen |
| 3,353,998 A | 11/1967 | Langguth et al. |
| 3,375,136 A | 3/1968 | Biggar |
| 3,431,327 A | 3/1969 | George |
| 3,642,539 A | 2/1972 | Kawakami |
| 4,118,860 A | 10/1978 | Buckler |
| 4,125,686 A | 11/1978 | Kinsman |
| 4,254,191 A | 3/1981 | Kniazzeh |
| 4,268,132 A | 5/1981 | Neefe |
| 4,294,891 A | 10/1981 | Yao |
| 4,408,023 A | 10/1983 | Gould et al. |
| 4,522,897 A | 6/1985 | Walsh |
| 4,592,944 A | 6/1986 | Clark et al. |
| 4,601,545 A | 7/1986 | Kern |
| 4,772,517 A | 9/1988 | Muenstedt et al. |
| 4,783,237 A | 11/1988 | Aine et al. |
| 4,787,903 A | 11/1988 | Grendahl |
| 4,816,031 A | 3/1989 | Pfoff |
| 4,846,031 A | 7/1989 | Voytilla et al. |
| 4,921,728 A | 5/1990 | Takiguchi et al. |
| 4,939,000 A | 7/1990 | Dodds et al. |
| 4,977,046 A | 12/1990 | Bleszinski, Jr. |
| 5,112,703 A | 5/1992 | Koenig |
| 5,168,018 A | 12/1992 | Yoshizawa et al. |
| 5,219,497 A | 6/1993 | Blum |
| 5,227,805 A | 7/1993 | King et al. |
| 5,358,539 A | 10/1994 | Dawson |
| 5,430,693 A | 7/1995 | Ganter et al. |
| 5,435,874 A | 7/1995 | Takeuchi et al. |
| 5,478,420 A | 12/1995 | Gauci et al. |
| 5,492,782 A | 2/1996 | Higley |
| 5,540,741 A | 7/1996 | Gozdz et al. |
| 5,549,988 A | 8/1996 | Reichert et al. |
| 5,568,353 A | 10/1996 | Bai et al. |
| 5,596,567 A | 1/1997 | Demuro et al. |
| 5,600,180 A | 2/1997 | Kusaka et al. |
| 5,607,485 A | 3/1997 | Gozdz et al. |
| 5,682,210 A | 10/1997 | Weirich |
| 5,712,721 A | 1/1998 | Large |
| 5,792,574 A | 8/1998 | Mitate et al. |
| 5,928,808 A | 7/1999 | Eshraghi |
| 6,004,691 A | 12/1999 | Eshraghi |
| 6,134,188 A | 10/2000 | Ganter et al. |
| 6,168,884 B1 | 1/2001 | Neudecker et al. |
| 6,217,171 B1 | 4/2001 | Auten et al. |
| 6,242,132 B1 | 6/2001 | Neudecker et al. |
| 6,273,904 B1 | 8/2001 | Chen |
| 6,277,520 B1 | 8/2001 | Moutsios |
| 6,282,668 B1 | 8/2001 | Neudecker |
| 6,316,142 B1 | 11/2001 | Delnick |
| 6,322,589 B1 | 11/2001 | Cumming |
| 6,355,501 B1 | 3/2002 | Fung et al. |
| 6,364,482 B1 | 4/2002 | Roffman et al. |
| 6,379,835 B1 | 4/2002 | Kucherovsky |
| 6,434,429 B1 | 8/2002 | Kraus et al. |
| 6,447,669 B1 | 9/2002 | Lain |
| 6,470,215 B1 | 10/2002 | Kraus et al. |
| 6,477,410 B1 | 11/2002 | Henley et al. |
| 6,490,487 B1 | 12/2002 | Kraus et al. |
| 6,517,974 B1 | 2/2003 | Kobayashi et al. |
| 6,544,171 B2 | 4/2003 | Beetz et al. |
| 6,553,262 B1 | 4/2003 | Lang et al. |
| 6,574,509 B1 | 6/2003 | Kraus et al. |
| 6,599,778 B2 | 7/2003 | Pogge et al. |
| 6,622,043 B1 | 9/2003 | Kraus et al. |
| 6,638,304 B2 | 10/2003 | Azar |
| 6,770,176 B2 | 8/2004 | Benson et al. |
| 6,852,254 B2 | 2/2005 | Spaulding et al. |
| 6,893,395 B1 | 5/2005 | Kraus et al. |
| 6,924,036 B2 | 8/2005 | Polastri et al. |
| 7,324,287 B1 | 1/2008 | Gollier |
| 7,404,636 B2 | 7/2008 | Blum et al. |
| 7,407,728 B2 | 8/2008 | Wenneis et al. |
| 7,410,700 B2 | 8/2008 | Wang |
| 7,423,801 B2 | 9/2008 | Kaufman et al. |
| 7,548,040 B2 | 6/2009 | Lee et al. |
| 7,581,124 B1 | 8/2009 | Jacobson et al. |
| 7,755,583 B2 | 7/2010 | Meredith |
| 7,794,643 B2 | 9/2010 | Watanabe et al. |
| 7,798,301 B2 | 9/2010 | Keating et al. |
| 7,876,573 B2 | 1/2011 | Motohara et al. |
| 7,901,811 B2 | 3/2011 | Hambitzer et al. |
| 7,959,769 B2 | 6/2011 | Zhang et al. |
| 7,968,991 B2 | 6/2011 | Wong et al. |
| 7,985,500 B2 | 7/2011 | Root |
| 7,991,934 B2 | 8/2011 | Yao et al. |
| 7,993,773 B2 | 8/2011 | Snyder et al. |
| 8,014,164 B2 | 9/2011 | Yang |
| 8,014,166 B2 | 9/2011 | Yazdani |
| 8,061,130 B2 | 11/2011 | Shibasaki |
| 8,309,397 B2 | 11/2012 | Shim, II et al. |
| 8,343,216 B2 | 1/2013 | Brady et al. |
| 8,579,435 B2 | 11/2013 | Blum et al. |
| 8,857,983 B2 | 10/2014 | Pugh et al. |
| 8,950,862 B2 | 2/2015 | Pugh et al. |
| 9,102,111 B2 | 8/2015 | Pugh et al. |
| 9,110,310 B2 | 8/2015 | Pugh et al. |
| 9,134,546 B2 | 9/2015 | Pugh et al. |
| 9,195,075 B2 | 11/2015 | Pugh et al. |
| 9,233,513 B2 | 1/2016 | Pugh et al. |
| 9,296,158 B2 | 3/2016 | Pugh et al. |
| 9,601,780 B2 | 3/2017 | Kato |
| 9,746,695 B2 * | 8/2017 | Flitsch ................ H01M 2/0202 |
| 2002/0009649 A1 | 1/2002 | Sato et al. |
| 2002/0041027 A1 | 4/2002 | Sugizaki |
| 2002/0041999 A1 | 4/2002 | Moutsios et al. |
| 2002/0058151 A1 | 5/2002 | Uchikoba et al. |
| 2002/0110728 A1 | 8/2002 | Gozdz et al. |
| 2002/0162631 A1 | 11/2002 | Wien et al. |
| 2003/0002160 A1 | 1/2003 | Johnson et al. |
| 2003/0021601 A1 | 1/2003 | Goldstein |
| 2003/0059526 A1 | 3/2003 | Benson et al. |
| 2003/0064292 A1 | 4/2003 | Neudecker et al. |
| 2003/0068559 A1 | 4/2003 | Armstrong et al. |
| 2003/0069666 A1 | 4/2003 | Nagler |
| 2003/0137922 A1 | 7/2003 | Ro et al. |
| 2003/0146414 A1 | 8/2003 | Ndzebet |
| 2003/0165744 A1 | 9/2003 | Schubert |
| 2003/0207978 A1 | 11/2003 | Yadav |
| 2004/0000732 A1 | 1/2004 | Spaulding et al. |
| 2004/0027536 A1 | 2/2004 | Blum et al. |
| 2004/0062985 A1 | 4/2004 | Aamodt |
| 2004/0084790 A1 | 5/2004 | Blum et al. |
| 2004/0091779 A1 | 5/2004 | Kang |
| 2004/0131925 A1 | 7/2004 | Jenson et al. |
| 2004/0239784 A1 | 12/2004 | Ibe |

(56) References Cited

U.S. PATENT DOCUMENTS

| | | |
|---|---|---|
| 2004/0239874 A1 | 12/2004 | Swab et al. |
| 2004/0241528 A1 | 12/2004 | Chiao |
| 2004/0242794 A1 | 12/2004 | Kanazawa |
| 2004/0258982 A1 | 12/2004 | Coffey |
| 2005/0009959 A1 | 1/2005 | Bair et al. |
| 2005/0031959 A1 | 2/2005 | Kato et al. |
| 2005/0036109 A1 | 2/2005 | Blum et al. |
| 2005/0069760 A1 | 3/2005 | Somatomo |
| 2005/0099594 A1 | 5/2005 | Blum et al. |
| 2005/0147877 A1 | 7/2005 | Tarnowski et al. |
| 2005/0185135 A1 | 8/2005 | Blum et al. |
| 2005/0208381 A1 | 9/2005 | Boulton |
| 2005/0231377 A1 | 10/2005 | Sunderman et al. |
| 2005/0231677 A1 | 10/2005 | Meredith |
| 2005/0255079 A1 | 11/2005 | Santerre et al. |
| 2005/0271796 A1 | 12/2005 | Neudecker et al. |
| 2006/0001137 A1 | 1/2006 | Hundt et al. |
| 2006/0024567 A1 | 2/2006 | Heller et al. |
| 2006/0026201 A1 | 2/2006 | Cabillic |
| 2006/0026505 A1 | 2/2006 | Mani et al. |
| 2006/0038536 A1 | 2/2006 | Lafollette et al. |
| 2006/0065989 A1 | 3/2006 | Druffel et al. |
| 2006/0066808 A1 | 3/2006 | Blum et al. |
| 2006/0095128 A1 | 5/2006 | Blum et al. |
| 2006/0099496 A1 | 5/2006 | Aamodt |
| 2006/0127761 A1 | 6/2006 | Phillips et al. |
| 2006/0152912 A1 | 7/2006 | Karrer et al. |
| 2006/0166088 A1 | 7/2006 | Hokanson et al. |
| 2006/0181676 A1 | 8/2006 | Tucker et al. |
| 2006/0202359 A1 | 9/2006 | Chen |
| 2006/0204839 A1 | 9/2006 | Richards et al. |
| 2006/0210877 A1 | 9/2006 | Manko et al. |
| 2006/0226556 A1 | 10/2006 | Kurita et al. |
| 2006/0234121 A1 | 10/2006 | Kim I et al. |
| 2006/0255441 A1 | 11/2006 | Ohta |
| 2006/0265058 A1 | 11/2006 | Silvestrini |
| 2006/0267167 A1 | 11/2006 | McCain |
| 2006/0267768 A1 | 11/2006 | Sabeta |
| 2007/0052876 A1 | 3/2007 | Kaufman et al. |
| 2007/0090869 A1 | 4/2007 | Adewole et al. |
| 2007/0125644 A1 | 6/2007 | Heller |
| 2007/0128420 A1 | 6/2007 | Maghribi |
| 2007/0141463 A1 | 6/2007 | Stevanovic |
| 2007/0156184 A1 | 7/2007 | Root |
| 2007/0159562 A1 | 7/2007 | Haddock et al. |
| 2007/0231575 A1 | 10/2007 | Watanabe et al. |
| 2007/0242171 A1 | 10/2007 | Mori |
| 2007/0242173 A1 | 10/2007 | Blum et al. |
| 2007/0285385 A1 | 12/2007 | Albert et al. |
| 2008/0002149 A1 | 1/2008 | Fritsch et al. |
| 2008/0020127 A1 | 1/2008 | Whiteford et al. |
| 2008/0020874 A1 | 1/2008 | Huang et al. |
| 2008/0024848 A1 | 1/2008 | Kawano et al. |
| 2008/0024858 A1 | 1/2008 | Kaufman et al. |
| 2008/0042227 A1 | 2/2008 | Asano et al. |
| 2008/0048180 A1 | 2/2008 | Abe et al. |
| 2008/0058652 A1 | 3/2008 | Payne |
| 2008/0079396 A1 | 4/2008 | Yamazaki et al. |
| 2008/0086206 A1 | 4/2008 | Nasiatka et al. |
| 2008/0101267 A1 | 5/2008 | Kurokawa |
| 2008/0187824 A1 | 8/2008 | Tomantschger |
| 2008/0208335 A1 | 8/2008 | Blum et al. |
| 2008/0212007 A1 | 9/2008 | Meredith |
| 2008/0241683 A1 | 10/2008 | Fensore et al. |
| 2008/0261390 A1 | 10/2008 | Chen et al. |
| 2008/0280184 A1 | 11/2008 | Sakai |
| 2009/0002012 A1 | 1/2009 | Doong et al. |
| 2009/0003383 A1 | 1/2009 | Watanabe et al. |
| 2009/0033863 A1 | 2/2009 | Blum et al. |
| 2009/0042065 A1 | 2/2009 | Simon et al. |
| 2009/0042066 A1 | 2/2009 | Simon et al. |
| 2009/0046349 A1 | 2/2009 | Haddock et al. |
| 2009/0050267 A1 | 2/2009 | Conlon et al. |
| 2009/0057289 A1 | 3/2009 | Williams |
| 2009/0079641 A1 | 3/2009 | Cruzado et al. |
| 2009/0091818 A1 | 4/2009 | Haddock et al. |
| 2009/0092903 A1 | 4/2009 | Johnson |
| 2009/0098281 A1 | 4/2009 | Zhang |
| 2009/0105817 A1 | 4/2009 | Bretthauer et al. |
| 2009/0142656 A1 | 6/2009 | Nathan et al. |
| 2009/0175016 A1 | 7/2009 | Legen et al. |
| 2009/0182426 A1 | 7/2009 | Von Arx et al. |
| 2009/0202899 A1 | 8/2009 | Pyszczek |
| 2009/0204207 A1 | 8/2009 | Blum et al. |
| 2009/0204454 A1 | 8/2009 | Lagudi |
| 2009/0206498 A1 | 8/2009 | Tepedino, Jr. et al. |
| 2009/0243125 A1 | 10/2009 | Pugh et al. |
| 2009/0244477 A1 | 10/2009 | Pugh et al. |
| 2009/0256977 A1 | 10/2009 | Haddock et al. |
| 2009/0269392 A1 | 10/2009 | Tauber et al. |
| 2009/0278503 A1 | 11/2009 | Hundt et al. |
| 2009/0288405 A1 | 11/2009 | Shibasaki |
| 2010/0001926 A1 | 1/2010 | Amirparviz et al. |
| 2010/0002190 A1 | 1/2010 | Clarke et al. |
| 2010/0062342 A1 | 3/2010 | Li |
| 2010/0072643 A1 | 3/2010 | Pugh |
| 2010/0073534 A1 | 3/2010 | Yano et al. |
| 2010/0076553 A1 | 3/2010 | Pugh |
| 2010/0078837 A1 | 4/2010 | Pugh |
| 2010/0078838 A1 | 4/2010 | Pugh et al. |
| 2010/0079724 A1 | 4/2010 | Pugh et al. |
| 2010/0103368 A1 | 4/2010 | Amirparviz et al. |
| 2010/0103369 A1 | 4/2010 | Pugh et al. |
| 2010/0109175 A1 | 5/2010 | Pugh et al. |
| 2010/0110372 A1 | 5/2010 | Pugh et al. |
| 2010/0149777 A1 | 6/2010 | Yamamoto et al. |
| 2010/0178543 A1 | 7/2010 | Gruner et al. |
| 2010/0211186 A1 | 8/2010 | Senders et al. |
| 2010/0261071 A1 | 10/2010 | Lopatin et al. |
| 2010/0266895 A1 | 10/2010 | Tucholski |
| 2010/0295135 A1 | 11/2010 | Masuoka et al. |
| 2011/0007656 A1 | 1/2011 | He et al. |
| 2011/0039150 A1 | 2/2011 | Wang et al. |
| 2011/0045112 A1 | 2/2011 | Pugh et al. |
| 2011/0074281 A1 | 3/2011 | Farquhar et al. |
| 2011/0076567 A1 | 3/2011 | Bouillon |
| 2011/0076568 A1 | 3/2011 | Bouillon |
| 2011/0086077 A1 | 4/2011 | McCrea et al. |
| 2011/0091778 A1 | 4/2011 | Kambara |
| 2011/0134683 A1 | 6/2011 | Yamazaki et al. |
| 2011/0143225 A1 | 6/2011 | Nakagawa |
| 2011/0174431 A1 | 7/2011 | Darmes et al. |
| 2011/0230963 A1 | 9/2011 | Cuevas |
| 2011/0284912 A1 | 11/2011 | Sekine et al. |
| 2011/0287318 A1 | 11/2011 | Loveness et al. |
| 2011/0311877 A1 | 12/2011 | Matsuda et al. |
| 2012/0024295 A1 | 2/2012 | Mihin |
| 2012/0026598 A1 | 2/2012 | Pugh et al. |
| 2012/0057244 A1 | 3/2012 | Pugh et al. |
| 2012/0088129 A1 | 4/2012 | Kaneda |
| 2012/0092612 A1 | 4/2012 | Binder |
| 2012/0100412 A1 | 4/2012 | Kwon et al. |
| 2012/0107666 A1 | 5/2012 | Bailey |
| 2012/0115041 A1 | 5/2012 | West |
| 2012/0156259 A1 | 6/2012 | Rau et al. |
| 2012/0162600 A1 | 6/2012 | Pugh |
| 2012/0171599 A1 | 7/2012 | Kishida |
| 2012/0188467 A1 | 7/2012 | Escuti et al. |
| 2012/0196187 A1 | 8/2012 | Fujinami et al. |
| 2012/0218508 A1 | 8/2012 | Pugh et al. |
| 2012/0234453 A1 | 9/2012 | Pugh et al. |
| 2012/0235277 A1 | 9/2012 | Pugh et al. |
| 2012/0236254 A1 | 9/2012 | Pugh et al. |
| 2012/0236524 A1 | 9/2012 | Pugh |
| 2012/0242953 A1 | 9/2012 | Pugh et al. |
| 2012/0245444 A1 | 9/2012 | Otis et al. |
| 2012/0259188 A1 | 10/2012 | Besling et al. |
| 2012/0282519 A1 | 11/2012 | Freitag et al. |
| 2013/0019540 A1 | 1/2013 | Magnus |
| 2013/0023005 A1 | 1/2013 | Chen et al. |
| 2013/0024575 A1 | 1/2013 | Taylor et al. |
| 2013/0034760 A1 | 2/2013 | Otts |
| 2013/0065122 A1 | 3/2013 | Chiang et al. |
| 2013/0089769 A1 | 4/2013 | Proctor |

(56) References Cited

U.S. PATENT DOCUMENTS

| | | |
|---|---|---|
| 2013/0155371 A1 | 6/2013 | Zhang |
| 2013/0194540 A1 | 8/2013 | Pugh et al. |
| 2013/0196214 A1 | 8/2013 | Scott |
| 2013/0215380 A1 | 8/2013 | Pugh et al. |
| 2013/0245754 A1 | 9/2013 | Blum et al. |
| 2013/0245755 A1 | 9/2013 | Fehr et al. |
| 2013/0266855 A1 | 10/2013 | Kim et al. |
| 2013/0266873 A1 | 10/2013 | Ishii et al. |
| 2013/0309547 A1 | 11/2013 | Bazzarella |
| 2014/0000101 A1 | 1/2014 | Pugh |
| 2014/0002788 A1 | 1/2014 | Otts |
| 2014/0017557 A1 | 1/2014 | Lockett et al. |
| 2014/0036226 A1 | 2/2014 | Blum et al. |
| 2014/0047742 A1 | 2/2014 | Schloss |
| 2014/0121557 A1 | 5/2014 | Gannon |
| 2014/0147742 A1 | 5/2014 | Anastas |
| 2014/0148899 A1 | 5/2014 | Fehr et al. |
| 2014/0227574 A1 | 8/2014 | Savinell et al. |
| 2014/0272522 A1 | 9/2014 | Pugh et al. |
| 2014/0306361 A1 | 10/2014 | Pugh et al. |
| 2014/0323968 A1 | 10/2014 | Rogers et al. |
| 2014/0342247 A1 | 11/2014 | Sarpeshkar |
| 2015/0212339 A1 | 7/2015 | Pugh et al. |
| 2015/0214567 A1 | 7/2015 | Etzkorn |
| 2015/0287960 A1 | 10/2015 | Andry |
| 2015/0288023 A1 | 10/2015 | Andry et al. |
| 2015/0288024 A1 | 10/2015 | Andry et al. |
| 2015/0309337 A1 | 10/2015 | Flitsch et al. |
| 2015/0323811 A1* | 11/2015 | Flitsch .............. G02C 7/04 351/159.03 |
| 2015/0378176 A1 | 12/2015 | Flitsch et al. |
| 2016/0028101 A1* | 1/2016 | Zhang .............. H01M 8/16 429/2 |
| 2016/0054589 A1* | 2/2016 | Otts .............. A61L 31/06 351/159.03 |
| 2016/0054590 A1* | 2/2016 | Flitsch .............. H01M 2/0202 351/159.03 |
| 2016/0056440 A1* | 2/2016 | Flitsch .............. H01M 2/0202 351/159.03 |
| 2016/0056459 A1 | 2/2016 | Flitsch et al. |
| 2016/0056498 A1* | 2/2016 | Flitsch .............. H01M 10/058 29/623.4 |
| 2017/0229730 A1 | 8/2017 | Flitsch et al. |

FOREIGN PATENT DOCUMENTS

| | | |
|---|---|---|
| AU | 2009293178 A1 | 3/2010 |
| AU | 2009293182 A1 | 3/2010 |
| AU | 2014201529 A1 | 10/2014 |
| BR | PI0919346 A2 | 12/2015 |
| CA | 2389907 A1 | 12/2003 |
| CA | 2737861 A1 | 3/2010 |
| CA | 2737865 A1 | 3/2010 |
| CN | 1344022 A | 4/2002 |
| CN | 1520983 A | 8/2004 |
| CN | 101041258 A | 9/2007 |
| CN | 101062581 A | 10/2007 |
| CN | 101094626 A | 12/2007 |
| CN | 100403477 C | 7/2008 |
| CN | 101395520 A | 3/2009 |
| CN | 101669059 A | 3/2010 |
| CN | 101983122 A | 3/2011 |
| CN | 102005612 A | 4/2011 |
| CN | 102159381 A | 8/2011 |
| CN | 102159382 A | 8/2011 |
| CN | 102171028 A | 8/2011 |
| CN | 102196789 A | 9/2011 |
| CN | 102202874 A | 9/2011 |
| CN | 102271899 A | 12/2011 |
| CN | 102727218 A | 10/2012 |
| CN | 102959769 A | 3/2013 |
| CN | 203300756 U | 11/2013 |
| CN | 102196789 B | 11/2014 |
| DE | 19858172 A1 | 6/2000 |
| DE | 102007048859 A1 | 4/2009 |
| EP | 581964 A1 | 2/1994 |
| EP | 918248 A2 | 5/1999 |
| EP | 1183745 A1 | 3/2002 |
| EP | 1262307 A2 | 12/2002 |
| EP | 1313159 A2 | 5/2003 |
| EP | 1342560 A2 | 9/2003 |
| EP | 1262307 A3 | 11/2003 |
| EP | 1342560 A3 | 9/2004 |
| EP | 1736291 A2 | 12/2006 |
| EP | 1747879 A2 | 1/2007 |
| EP | 1736291 A3 | 3/2007 |
| EP | 1747879 A3 | 3/2007 |
| EP | 1760515 A2 | 3/2007 |
| EP | 1849574 A2 | 10/2007 |
| EP | 1849589 A2 | 10/2007 |
| EP | 1892788 A1 | 2/2008 |
| EP | 1342560 B1 | 7/2008 |
| EP | 1849589 A3 | 3/2009 |
| EP | 1262307 B1 | 2/2010 |
| EP | 1760515 A3 | 8/2011 |
| EP | 2349697 A2 | 8/2011 |
| EP | 2349698 A1 | 8/2011 |
| EP | 2485294 A1 | 8/2012 |
| EP | 2508935 A1 | 10/2012 |
| EP | 2564454 A1 | 3/2013 |
| EP | 2605314 A2 | 6/2013 |
| EP | 2620802 A1 | 7/2013 |
| EP | 2631962 A1 | 8/2013 |
| EP | 2779272 A1 | 9/2014 |
| EP | 2812750 A1 | 12/2014 |
| EP | 2996187 A2 | 3/2016 |
| EP | 2740170 B1 | 4/2016 |
| EP | 3016194 A1 | 5/2016 |
| GB | 743731 A | 1/1956 |
| GB | 1307393 A | 2/1973 |
| IL | 211275 | 4/2011 |
| IL | 211309 | 4/2011 |
| IL | 222620 | 12/2012 |
| JP | S52146650 A | 12/1977 |
| JP | S57136774 A | 8/1982 |
| JP | S58116764 A | 7/1983 |
| JP | S63105319 U | 7/1988 |
| JP | H01286809 A | 11/1989 |
| JP | H11135712 A | 5/1991 |
| JP | H0765817 A | 3/1995 |
| JP | H08162823 A | 6/1996 |
| JP | H08508826 A | 9/1996 |
| JP | H08264203 A | 10/1996 |
| JP | H09266636 A | 10/1997 |
| JP | H10209185 A | 8/1998 |
| JP | H10219185 A | 8/1998 |
| JP | H10229095 A | 8/1998 |
| JP | 2000228213 A | 8/2000 |
| JP | 2000299542 A | 10/2000 |
| JP | 2001028036 A | 1/2001 |
| JP | 2001110445 A | 4/2001 |
| JP | 2002093385 A | 3/2002 |
| JP | 2002118198 A | 4/2002 |
| JP | 2002537580 A | 11/2002 |
| JP | 2003202525 A | 7/2003 |
| JP | 2004505667 A | 2/2004 |
| JP | 2004305313 A | 11/2004 |
| JP | 2005142050 A | 6/2005 |
| JP | 2005523483 A | 8/2005 |
| JP | 2005535942 A | 11/2005 |
| JP | 2006507541 A | 3/2006 |
| JP | 2006093659 A | 4/2006 |
| JP | 2006317321 A | 11/2006 |
| JP | 2007533098 A | 11/2007 |
| JP | 2007313594 A | 12/2007 |
| JP | 2008502016 A | 1/2008 |
| JP | 2008506031 A | 2/2008 |
| JP | 2008053134 A | 3/2008 |
| JP | 2008072111 A | 3/2008 |
| JP | 2008088019 A | 4/2008 |
| JP | 2008512348 A | 4/2008 |
| JP | 2008178226 A | 7/2008 |
| JP | 2008529208 A | 7/2008 |

(56) References Cited

FOREIGN PATENT DOCUMENTS

| | | |
|---|---|---|
| JP | 2008227068 A | 9/2008 |
| JP | 2008281095 A | 11/2008 |
| JP | 2009007629 A | 1/2009 |
| JP | 2009087895 A | 4/2009 |
| JP | 2010034254 A | 2/2010 |
| JP | 2010073533 A | 4/2010 |
| JP | 2010517081 A | 5/2010 |
| JP | 2010209855 A | 9/2010 |
| JP | 2010536158 A | 11/2010 |
| JP | 2011082586 A | 4/2011 |
| JP | 2011512565 A | 4/2011 |
| JP | 2011515157 A | 5/2011 |
| JP | 2011516922 A | 5/2011 |
| JP | 2011516927 A | 5/2011 |
| JP | 2011517659 A | 6/2011 |
| JP | 2012009820 A | 1/2012 |
| JP | 2012502823 A | 2/2012 |
| JP | 2012503222 A | 2/2012 |
| JP | 2012504065 A | 2/2012 |
| JP | 2012504257 A | 2/2012 |
| JP | 2012044074 A | 3/2012 |
| JP | 2012056758 A | 3/2012 |
| JP | 2012507747 A | 3/2012 |
| JP | 2013516255 A | 5/2013 |
| JP | 2013532010 A | 8/2013 |
| JP | 2013533046 A | 8/2013 |
| JP | 2013176558 A | 9/2013 |
| JP | 2013239263 A | 11/2013 |
| JP | 5591567 B2 | 9/2014 |
| JP | 5788668 B2 | 10/2015 |
| KR | 100625892 B1 | 9/2006 |
| KR | 20070009231 A | 1/2007 |
| KR | 20100102969 A | 9/2010 |
| KR | 20100132003 A | 12/2010 |
| KR | 20110069113 A | 6/2011 |
| KR | 20110073530 A | 6/2011 |
| KR | 20130096676 A | 8/2013 |
| RU | 2116891 C1 | 8/1998 |
| RU | 2307429 C1 | 9/2007 |
| RU | 2310952 C2 | 11/2007 |
| RU | 2320378 C2 | 3/2008 |
| RU | 2380794 C1 | 1/2010 |
| RU | 2563842 C2 | 9/2015 |
| SG | 10201400548X A | 10/2014 |
| SG | 10201506558 A1 | 3/2016 |
| TW | 200532278 A | 10/2005 |
| TW | 200629549 A | 8/2006 |
| TW | 200916832 A | 4/2009 |
| TW | 200950960 A | 12/2009 |
| TW | 201003172 A | 1/2010 |
| TW | 201024827 A | 7/2010 |
| TW | 201026489 A | 7/2010 |
| TW | 201029830 A | 8/2010 |
| TW | 201140756 A | 11/2011 |
| TW | I384672 B | 2/2013 |
| WO | WO-9423334 A1 | 10/1994 |
| WO | WO1997017737 A1 | 5/1997 |
| WO | WO-0004601 A1 | 1/2000 |
| WO | WO2000057504 A1 | 9/2000 |
| WO | WO2002029836 A1 | 4/2002 |
| WO | WO-03035166 A2 | 5/2003 |
| WO | WO2003069700 A2 | 8/2003 |
| WO | WO-03078300 A1 | 9/2003 |
| WO | WO-03090611 A1 | 11/2003 |
| WO | WO-2004015460 A2 | 2/2004 |
| WO | WO-2004015460 A3 | 6/2004 |
| WO | WO2003069700 A3 | 8/2004 |
| WO | WO-2004093786 A2 | 11/2004 |
| WO | WO2005064712 A1 | 7/2005 |
| WO | WO-2005088388 A1 | 9/2005 |
| WO | WO-2005098994 A1 | 10/2005 |
| WO | WO-2006050171 A2 | 5/2006 |
| WO | WO-2006077192 A1 | 7/2006 |
| WO | WO-2006078472 A2 | 7/2006 |
| WO | WO-2006050171 A3 | 9/2006 |
| WO | WO-2005098994 A9 | 11/2006 |
| WO | WO-2006115649 A2 | 11/2006 |
| WO | WO-2007050402 A2 | 5/2007 |
| WO | WO-2006115649 A3 | 6/2007 |
| WO | WO-2007072781 A1 | 6/2007 |
| WO | WO-2007081959 A2 | 7/2007 |
| WO | WO2007102692 A1 | 9/2007 |
| WO | WO-2008010390 A1 | 1/2008 |
| WO | WO2008039806 A2 | 4/2008 |
| WO | WO-2007081959 A3 | 5/2008 |
| WO | WO2008039806 A3 | 7/2008 |
| WO | WO-2008091859 A1 | 7/2008 |
| WO | WO-2008103906 A2 | 8/2008 |
| WO | WO-2008109867 A2 | 9/2008 |
| WO | WO-2008109867 A3 | 10/2008 |
| WO | WO-2008103906 A3 | 11/2008 |
| WO | WO2009012463 A2 | 1/2009 |
| WO | WO2009018315 A2 | 2/2009 |
| WO | WO-2009025763 A2 | 2/2009 |
| WO | WO-2007050402 A3 | 3/2009 |
| WO | WO-2009038897 A2 | 3/2009 |
| WO | WO-2009038897 A3 | 6/2009 |
| WO | WO-2009105261 A1 | 8/2009 |
| WO | WO-2009109867 A2 | 9/2009 |
| WO | WO-2009113296 A1 | 9/2009 |
| WO | WO-2009117506 A2 | 9/2009 |
| WO | WO-2009117506 A3 | 1/2010 |
| WO | WO-2010033679 A2 | 3/2010 |
| WO | WO-2010033683 A1 | 3/2010 |
| WO | WO-2010039610 A2 | 4/2010 |
| WO | WO-2010051203 A1 | 5/2010 |
| WO | WO-2010051225 A1 | 5/2010 |
| WO | WO-2010058574 A1 | 5/2010 |
| WO | WO-2010033679 A3 | 6/2010 |
| WO | WO-2010051225 A9 | 6/2010 |
| WO | WO-2010062504 A2 | 6/2010 |
| WO | WO-2010039610 A3 | 7/2010 |
| WO | WO-2010082993 A2 | 7/2010 |
| WO | WO-2010082993 A3 | 9/2010 |
| WO | WO-2010119754 A1 | 10/2010 |
| WO | WO-2010133317 A1 | 11/2010 |
| WO | WO-2011005216 A1 | 1/2011 |
| WO | WO-2011007548 A1 | 1/2011 |
| WO | WO2011015866 A1 | 2/2011 |
| WO | WO-2011083105 A1 | 7/2011 |
| WO | WO-2010133317 A9 | 10/2011 |
| WO | WO2011137239 A1 | 11/2011 |
| WO | WO-2011153158 A1 | 12/2011 |
| WO | WO-2011163080 A1 | 12/2011 |
| WO | WO-2012013774 A1 | 2/2012 |
| WO | WO-2012018583 A1 | 2/2012 |
| WO | WO-2012023774 A2 | 2/2012 |
| WO | WO2012046854 A1 | 4/2012 |
| WO | WO-2012129210 A2 | 9/2012 |
| WO | WO-2013019525 A1 | 2/2013 |
| WO | WO03065481 | 8/2013 |
| WO | WO-2013112748 A1 | 8/2013 |
| WO | WO2013128206 A1 | 9/2013 |
| WO | WO-2014049089 A1 | 4/2014 |
| WO | WO2014071571 A1 | 5/2014 |

OTHER PUBLICATIONS

Beynw E., "3D System Integration Technologies", 2006, IEEE, International Symposium on VLSI Technology, System and Applications, 2006, 9 pages.

Breakthrough Technologies Driving Successful Energy Harvesting-Powered Products, PSMA Energy Harvesting Forum, Mar. 2014. [retrieved on Jan. 22, 2018] Retrieved from the Internet:[URL:http://www.psma.com/sites/default/files/uploads/tech-forums-energy-harvesting/presentations/is 1-1-1-energy-harvesting-market -requirements-economicsv].

Bruno L.J.S., et al., "Correlation Between Morphological Properties and Ionic Conductivity in an Electrolyte Based on Poly(Vinylidene Fluoride) and Poly(2-hydroxyethyl Methacrylate)," Materials Research, Feb. 2014, vol. 17 (1), pp. 115-120, XP055227556.

(56) References Cited

OTHER PUBLICATIONS

Cohenladdad J.P., et al., "NMR Study of the Demixing Process in Concentrated polyisobutylene Solutions," Journal of Polymer Science: Polymer Physics Edition, Sep. 1981, vol. 19 (9), pp. 1395-1403.
Davies C., "Opto-Electronic Contact Lenses Promise Wireless Displays," Nov. 2009. Retrieved from the Internet: [URL:http://www.slashgear.com/opto-electronic-contact-lenses-promise-wireless---displays-2564454/].
Gosalia K.C., "Novel Compact Antennas for Biomedical Implants and Wireless Applications," PhD Dissertation, North Carolina State University, 2004, [retrieved on Dec. 22, 2014] Retrieved from the Internet[URL:http://respitory.lib.ncsu.edu/ir/bitstream/1840.16/4508/1/etd.pdf?-origin=publication.sub.--detail].
Herb G., Zinc Plating [Online], Jan. 1, 1988 [retrieved on Jul. 20, 2016]. Retrieved from the Internet: (URL:http://infohouse.p2ric.orgyef/29/28085.pdf), XP055290076.
Hill J., "How to Uniformly Disperse Nanoparticles in Battery Cathode Coatings," Advanced Materials and Processes, May 2010, vol. 168 (5), pp. 34-36.
Loy M., et al., "ISM-Band and Short Range Device Antennas," Texas Instruments Application Report, Aug. 2005. Retrieved from the Internet:[URL:http://www.ti.com/lit/an/swra046a/swra046a.pdf].
Neudecker B.J., et al., "Power Fibers: Thin-Film Batteries on Fiber Substrates," Report Documented by ITN Energy Systems, Inc., Littleton, CO, 2003, pp. 1-9.
Orca S., "Micro Machines and Opto-Electronics on a Contact Lens", Nov. 2009. Retrieved from the Internet: [URL:http://hplusmagazine.com/2009/11/20/micro-machines-and-opto-electronics-contact-lense/].
Pandey J., et al., "A Fully Integrated RF-Powered Contact Lens With a Single Element Display," IEEE Transactions on Biomedical Circuits and Systems, Dec. 2010, vol. 4 (6), pp. 454-461.
Pandey J., et al., "Toward an Active Contact Lens: Integration of a Wireless Power Harvesting IC," Biomedical Circuits and Systems Conference, 2009, BioCAS 2009, pp. 125-128. Retrieved from the Internet [URL: https://wireless.ee.washington.edu/wp-content/uploads/sites/17/2013/03/biocas2009_jnpyudobpo.pdf.
Parviz B.A., "Augmented Reality in a Contact Lens, A New Generation of Contact Lenses Built With Very Small Circuits and LEDs Promises Bionic Eyesight," IEEE Spectrum.org/biomedical/bionics, [retrieved Jul. 10, 20012].
Parviz B.A., "Augmented Reality in a Contact Lens," IEEE Spectrum, Sep. 2009. Retrieved from the Internet:[URL:https://spectrunieee.org/biomedical/bionics/augmented- reality-in-a-contact-lens].
Ratta V., "Crystallization, Morphology, Thermal Stability and Adhesive Properties of Novel High Performance Semicrystalline Polyimides," Virginia Tech University, Chapter 4, PhD Dissertation defended Apr. 26, 1999.
Shi S., et al., "Flexible Asymmetric Supercapacitors Based on Ultrathin Two-dimensional Nanosheets With Outstanding Electrochemical Performance and Aesthetic Property Supplementary Information (SI)," Scientific Reports, Feb. 11, 2014, vol. 3, Article No. 2598, pp. 1-10, XP055485252, Retrieved from the Internet: URL: https://media.nature.com/original/nature-assets/srep/2013/130906/srep02598/extref/srep02598-s1.pdf.
Tafur, J.P., et al., "Influence of the Ionic Liquid Type on the Gel Polymer Electrolytes Properties," Membranes (Basel), Dec. 2015, vol. 5(4), pp. 752-771.
Williams A., "Swiss Startup Puts Mems Sensor in Contact Lens," Electronics Weekly.com, Mar. 25, 2010. Retrieved from the Internet[URL:https://www.electronicsweekly.com/technology-startups/general-technology-startups/swiss-startup-puts-mems-sensor-2010-03/swiss-startup-puts-mems-sensor.html].
Jani Miettinen et al., "System Design Issue for 3D System-in-Package (SiP)", 2004, vol. 1, p. 610-615.
Geduld, Herb, "Zinc Plating", XP055290076, Columbia Chemical Corp., Macedonia, OH Jan. 1, 1988.
Fernando Yanez et al., "Macromolecule release and smoothness of semi-interpenetrating Pvp-pHEMA networks for comfortable soft contact lenses", European Journal of Pharmaceutics, Elsevier Science Publishers B.V., Amsterdam, NL, vol. 69, No. 3, Aug. 1, 2008, pp. 1094-1103, XP023519572, ISSN: 0939-6411.
Elena A. Belyaeva et al., "Mechanism(s) of Toxic Action of Zn2+ and Selenite: A Study on As-30D Hepatoma Cells and Isolated Mitochondria", Biochemistry Research International, vol. 42, No. 6, Jan. 1, 2011, pp. 361-13.
Albano et al., "Design of an Implantable power supply for an intraocular sensor, using Power (power optimization for wireless energy requirements)" Journal of Power Soureces, Elsevier SA, CH, vol. 170, No. 1, Apr. 11, 2007, pp. 216-224.
Stani A. et al., "Development of flat plate rechargeable alkaline manganese dioxide-zinc cells", Journal of Power Sources, Elsevier SA, vol. 153, No. 2, Jun. 28, 2005, pp. 405-12.
A. M. Gaik,Apad, B. V. Khat, G. Davies, B. Hertzberg, D. A. Steingart, and A. C. Arias, "A High Areal Capacity Flexible Lithium-Ion Battery with a Strain-Compliant Design," Advanced Energy Materials, vol. 5, iss. 3, 2015.
A. M. Gaikwad, A. C. Arias, and D. A. Steingart, "Recent Progress on Printed Flexible Batteries: Mechanical Challenges, Printing Technologies, and Future Prospects," Energy Technology, 2015.
A. E. Ostfeid. I. Deckrnan, A. M. Gaikwad, C, M. Lochner, and A. C. Arias, "Screen printed passive components for flexible power electronics," Scientific reports, vol. 5, 2015.
Y. Oka et al., "Preparation of cathode film with use of aqueous solvent system", 224th ECS Meeting (Abstract #851), Oct. 27, 2013, Nov. 1, 2013, XP055442472, San Francisco, CA, USA *part "Experimental procedures"*.

* cited by examiner

FIG. 1A
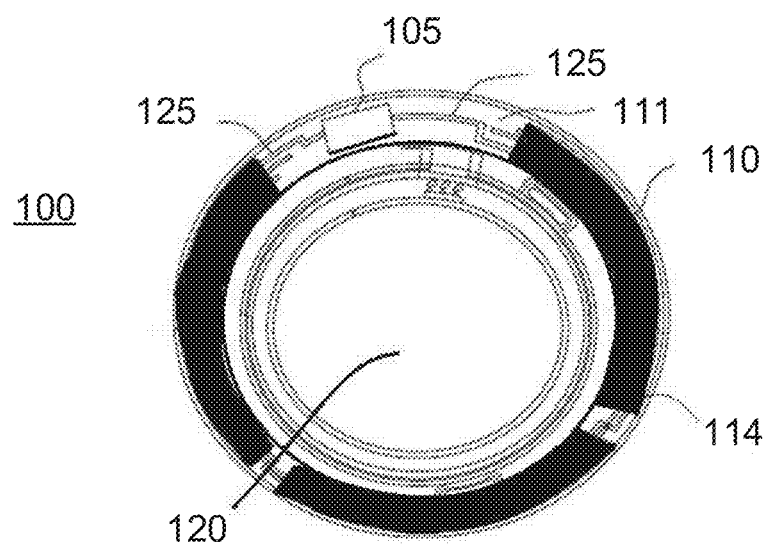
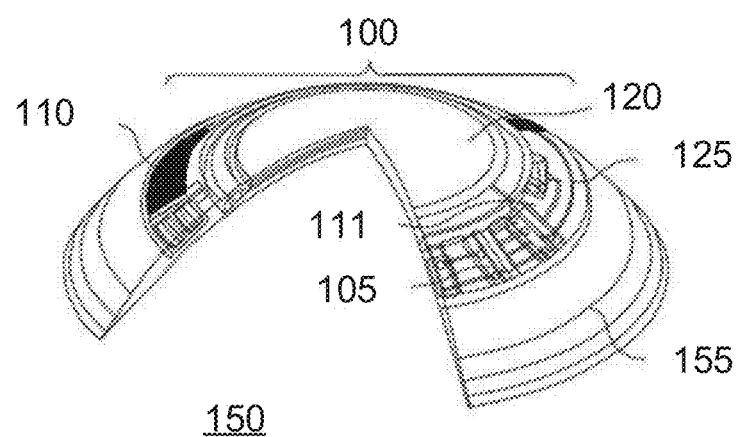
FIG. 1B

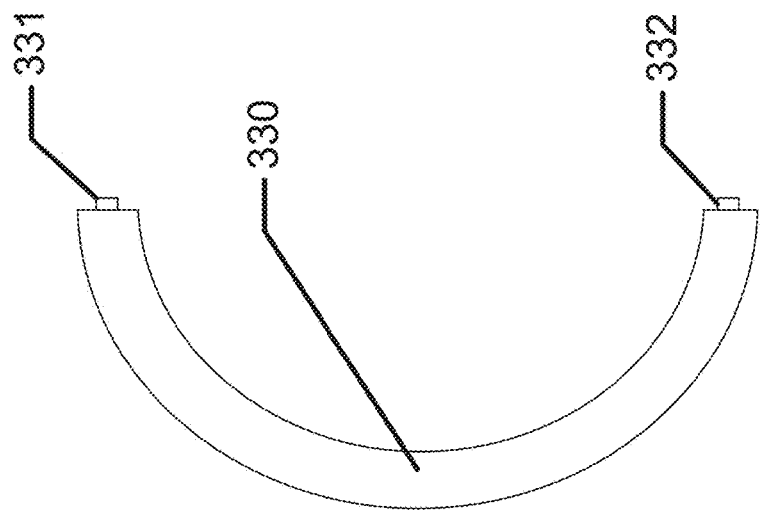
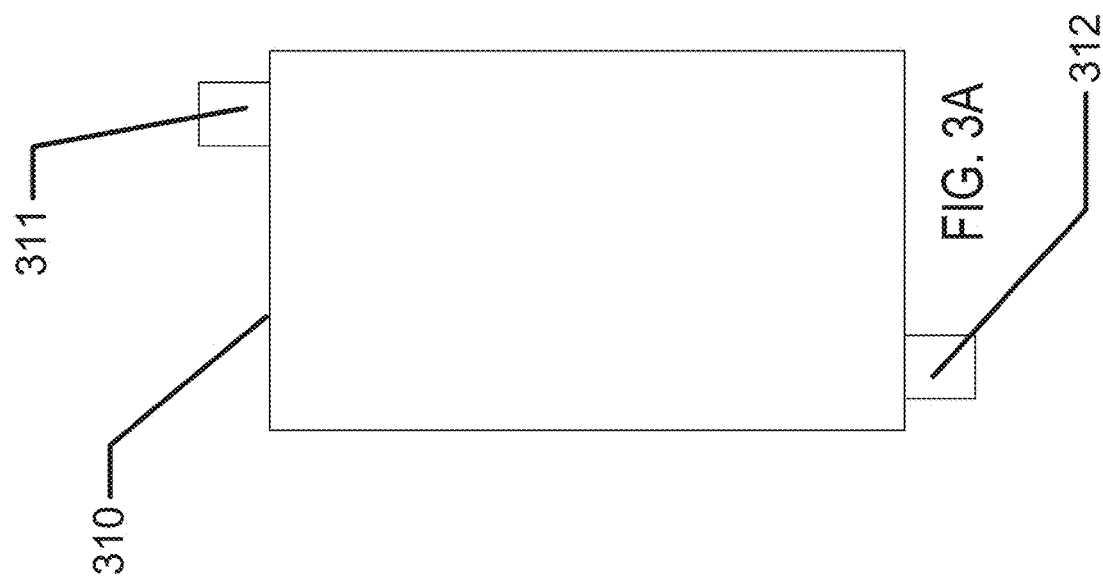

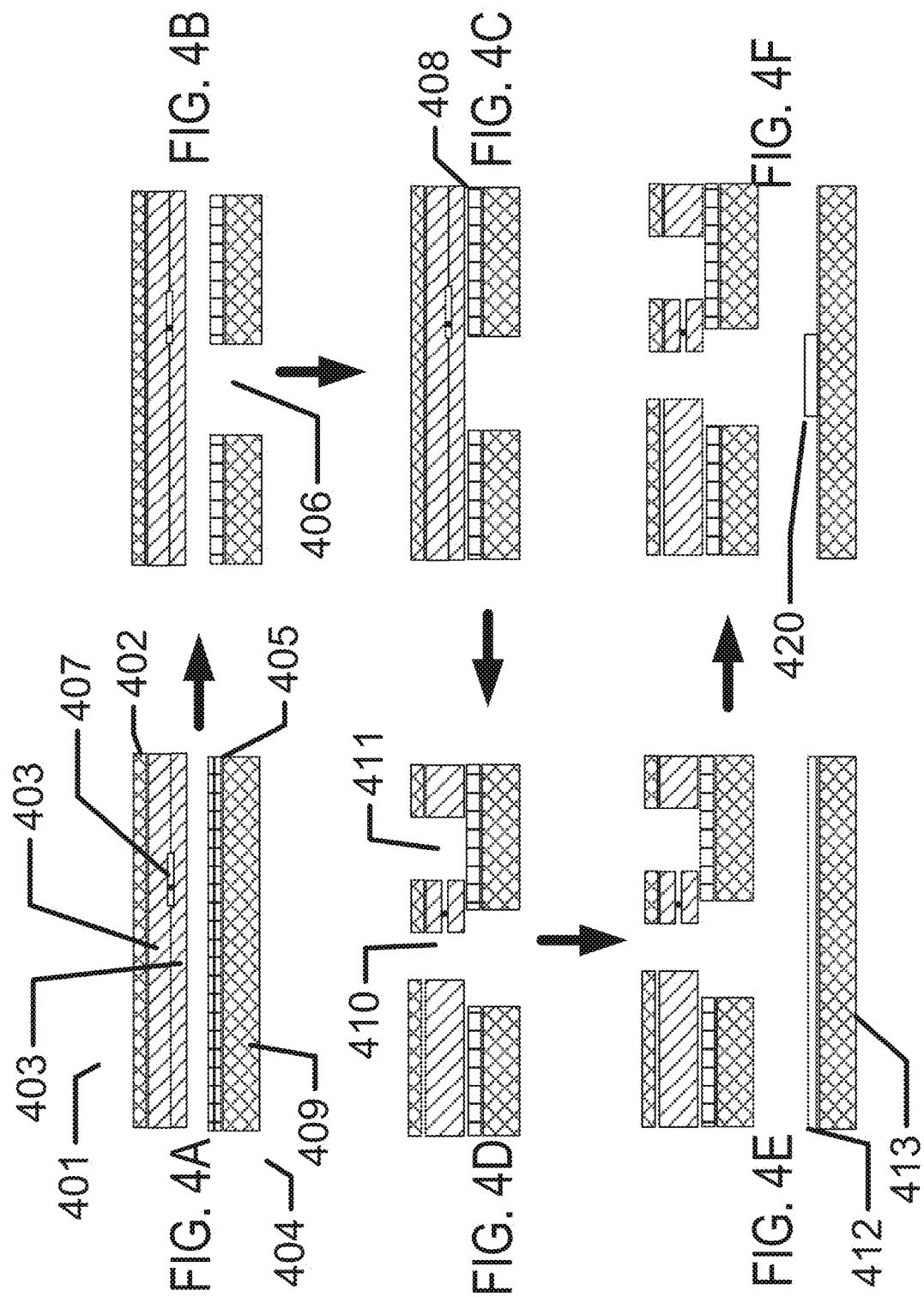

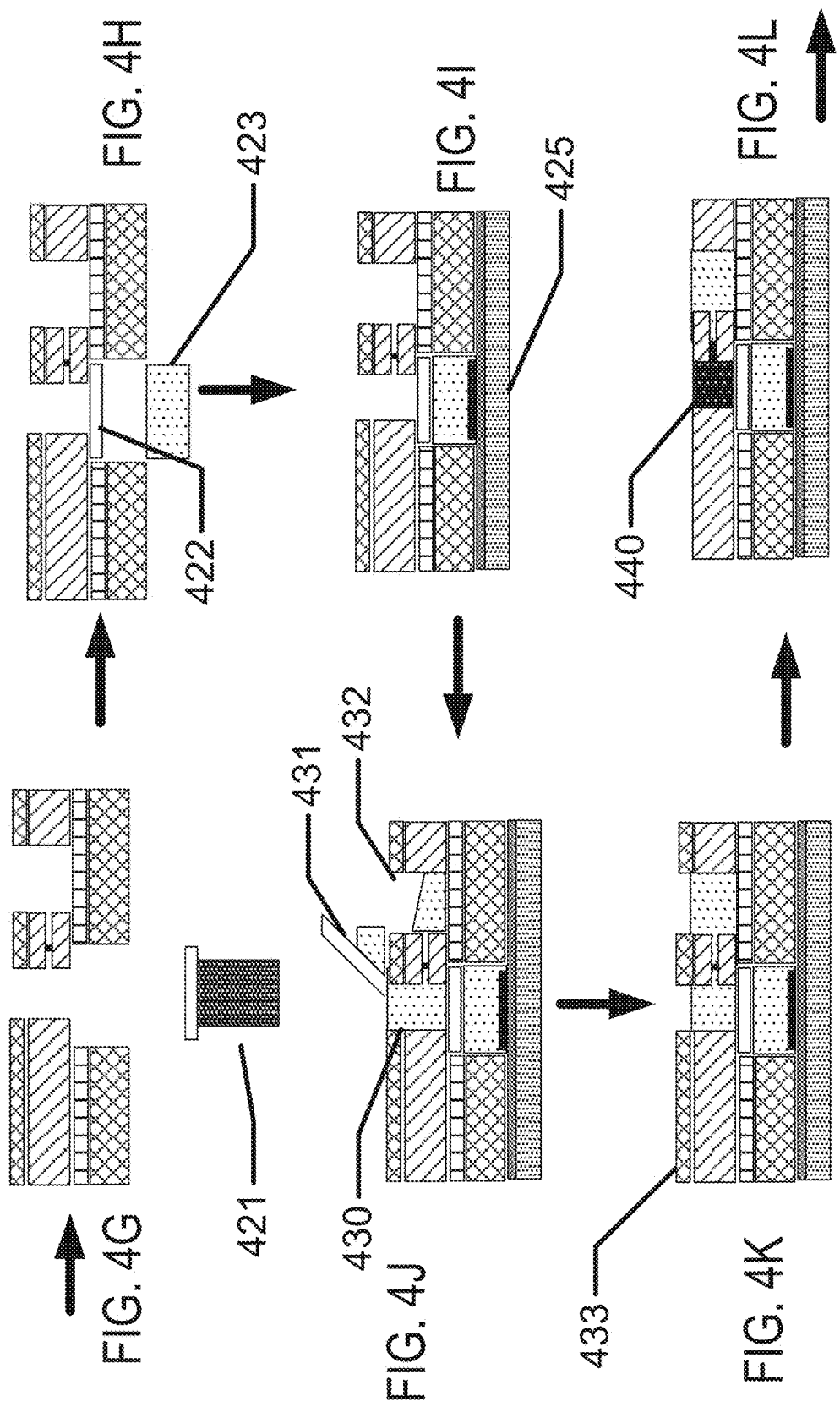

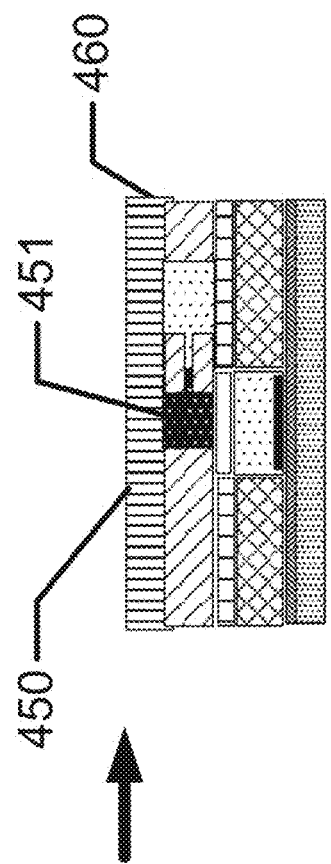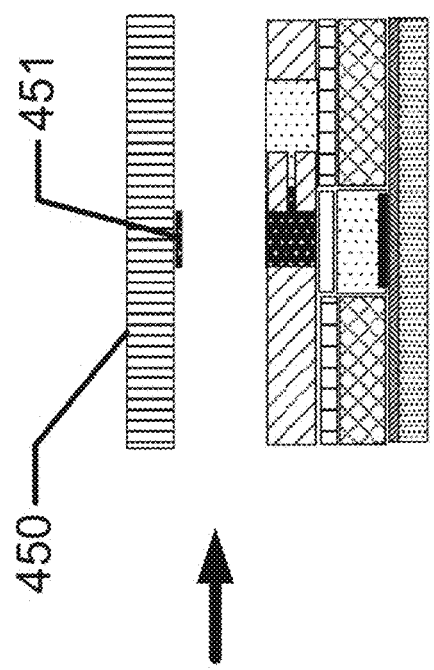

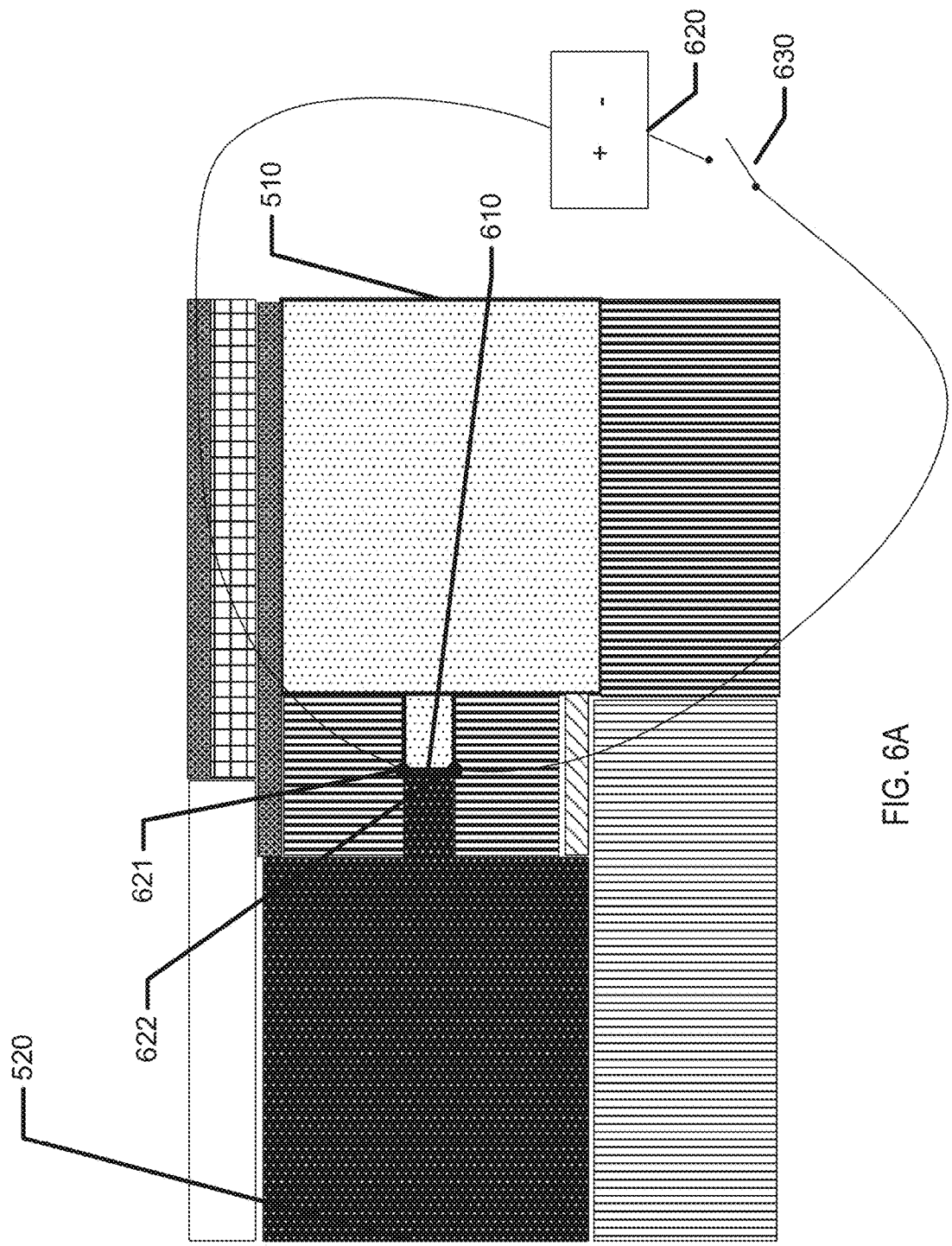

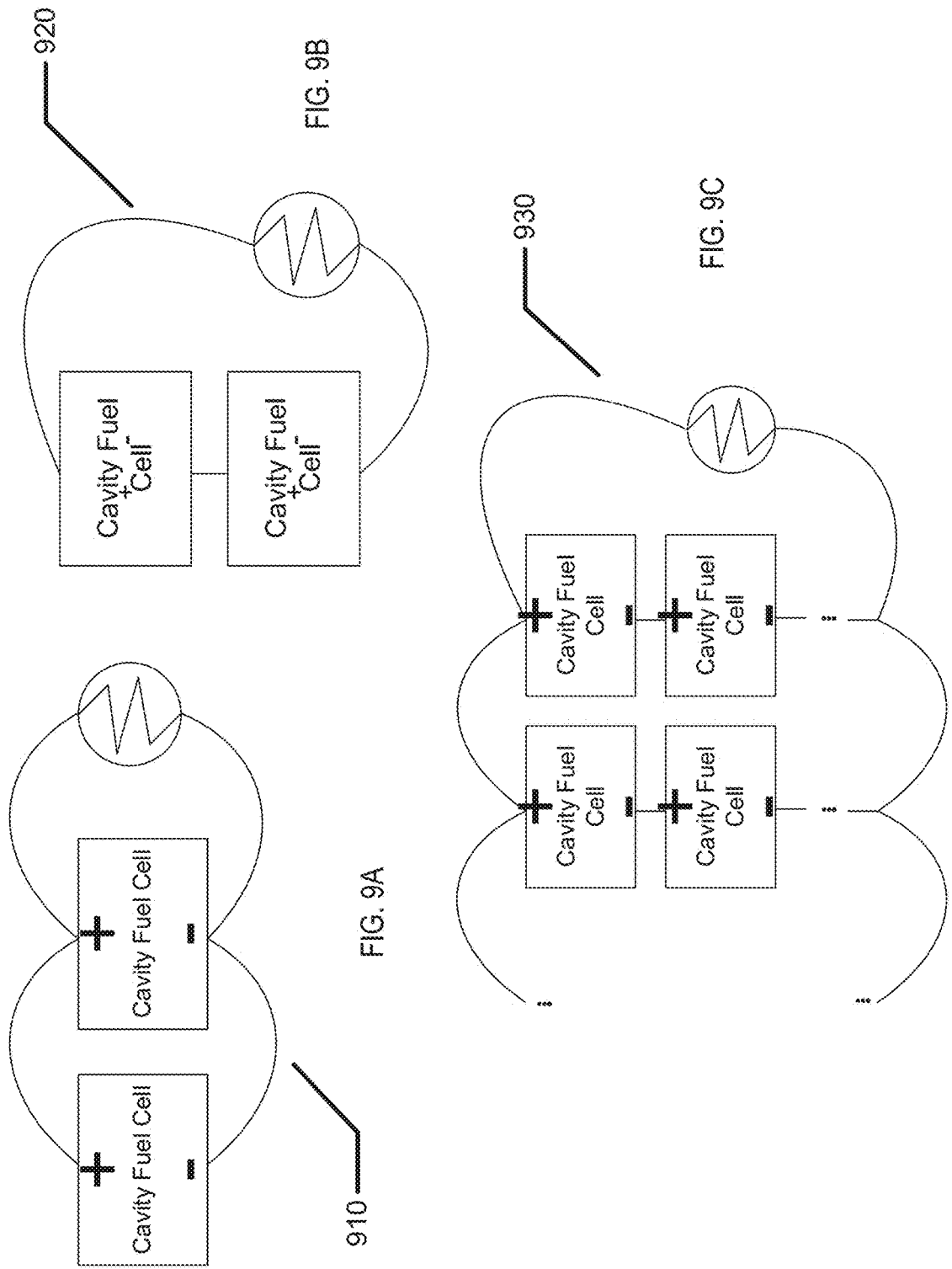

METHODS AND APPARATUS TO FORM BIOCOMPATIBLE ENERGIZATION ELEMENTS INCORPORATING FUEL CELLS FOR BIOMEDICAL DEVICES

BACKGROUND OF THE INVENTION

1. Field of the Invention

Methods and apparatus to form biocompatible energization elements are described. In some embodiments, the methods and apparatus to form the biocompatible energization elements involve forming a membrane element of the energization element. The active elements including anodes, cathodes and fuel cell solutions may be electrochemically connected and may interact with the formed membrane elements. In some embodiments, a field of use for the methods and apparatus may include any biocompatible device or product that requires energization elements.

2. Discussion of the Related Art

Recently, the number of medical devices and their functionality has begun to rapidly develop. These medical devices can include, for example, implantable pacemakers, electronic pills for monitoring and/or testing a biological function, surgical devices with active components, contact lenses, infusion pumps, and neurostimulators. Added functionality and an increase in performance to the many of the aforementioned medical devices has been theorized and developed. However, to achieve the theorized added functionality, many of these devices now require self-contained energization means that are compatible with the size and shape requirements of these devices, as well as the energy requirements of the new energized components.

Some medical devices may include components such as semiconductor devices that perform a variety of functions and can be incorporated into many biocompatible and/or implantable devices. However, such semiconductor components require energy and, thus, energization elements may typically also be included in such biocompatible devices. The topology and relatively small size of the biocompatible devices creates novel and challenging environments for the definition of various functionalities. In many embodiments, it may be important to provide safe, reliable, compact and cost effective means to energize the semiconductor components within the biocompatible devices. Therefore, a need exists for novel embodiments of forming biocompatible energization elements for implantation within or upon biocompatible devices where the structure of the elements provides enhanced containment for chemical components of the energization elements as well as improved control over the quantity of chemical components contained in the energization element. Fuel cells, particularly those that utilize bioavailable fuel sources, may be good solutions as energization elements. In some cases, combinations of fuel cells and batteries may provide energy to biomedical devices.

SUMMARY OF THE INVENTION

Accordingly, methods and apparatus to form biocompatible energization elements are disclosed which afford manufacturing advantages while creating structures which may significantly contain the fuel cell chemistry. As well, the structural design may also provide for inherent control of the quantities of the energization elements found within the fuel cell elements.

In some embodiments an energization element may be formed by placing layers of structure together in a stack. An anode spacer layer may have a first hole cut out from the anode layer. The spacer layer sidewalls of the hole may be portions of a cavity that is formed when multiple layers are stacked. A cathode spacer layer may have a second hole cut into it. In some examples, the second hole may be aligned to the first hole. The second hole may be larger than the first hole, and when the holes are aligned to each other, a ridge of anode spacer layer material may be exposed in the first hole. A membrane layer may be cut to a size and shape that it may fit into the second hole and be larger than the first hole. The membrane layer may be placed within the second hole and adhered to the ridge of anode spacer layer material. The structure may form a first cavity between the sides of the first hole and a first surface of the membrane layer. The first cavity may be filled with an anode solution. A second cavity may result from the placement of the membrane layer and may comprise surfaces of the membrane layer and exposed side wall regions of the second hole in the cathode spacer layer. There may be regions on the ridge of anode spacer layer material that may be within the second cavity in some examples. The second cavity may be filled with a cathode solution. There may also be a third cavity that is filled with a fuel solution. In some examples a channel may be formed that provide fluid movement between the third cavity and the first cavity. In some examples the anode solution may comprise a first enzyme. In some examples, the anode solution comprises glucose-6-phosphate dehydrogenase. In some examples the anode solution comprises α-glucan phosphorylase. The anode solution may also comprise phosphoglucomutase in some examples. In some examples the anode solution may comprise 6-phosphogluconate dehydrogenase. At least one of the various types of energization elements comprising one or more of the exemplary options may be electrically connected to an electroactive element within a biomedical device. The biomedical device may be an ophthalmic device. The ophthalmic device may be a contact lens. The fuel solution and other solutions within the energization element may comprise one or more of maltodextrin and glucose. There may be numerous seals that are formed within the energization element to isolate the various cavities from each other as well as isolating the material within the energization element from outside the energization element. The seals may be formed between the anode spacer layer and the cathode spacer layer. In some examples, there may be intermediate layers between the anode spacer layer and the cathode spacer layer that are comprised after treatment into the seal. The seal may be formed by one or more of laser welding, ultrasonic welding, and direct thermal welding. The seal may also be formed by photo-patterning of polymer seals.

In another example, a biocompatible energization element may be formed from multiple layers. An anode spacer layer may be formed, and a first hole may be cut into the anode spacer layer by various means including laser cutting and die punching. A cathode layer may also be formed. A second hole may be located into the cathode spacer layer. The second hole may be aligned to the first hole. In some examples a membrane layer may be placed between the anode layer and the cathode layer. In other examples, the second hole may be cut to be larger than the first hole. The second hole and the first hole may be aligned into the device. The aligned first hole and second hole may form a ridge of anode spacer material that may be exposed in the second hole. A membrane layer may be formed into a shape that may fit within the second hole. The membrane may be placed within the second hole and adhered to the ridge of anode spacer layer material. The structure may form a first cavity between the sides of the first hole and a first surface of the membrane layer. The first cavity may be filled with an anode solution. A second cavity may result from the placement of the membrane layer and may comprise surfaces of the membrane layer and exposed side wall regions of the second hole in the cathode spacer layer. There may be regions on the ridge of anode spacer layer material that may be within the second cavity in some examples. The second cavity may be filled with a cathode solution. There may also be a third cavity that is filled with a fuel solution. In some examples a channel may be formed that provide fluid movement between the third cavity and the first cavity. The channel may include an electrically actuated channel blocking mechanism, wherein the channel blocking mechanism blocks the channel connecting the third cavity to the first cavity, and wherein the electrical actuation allows fuel to flow from the third cavity into the first cavity. In some examples the anode solution may comprise a first enzyme. In some examples, the anode solution comprises glucose-6-phosphate dehydrogenase. In some examples the anode solution comprises α-glucan phosphorylase. The anode solution may also comprise phosphoglucomutase in some examples. In some examples the anode solution may comprise 6-phosphogluconate dehydrogenase. At least one of the various types of energization elements comprising one or more of the exemplary options may be electrically connected to an electroactive element within a biomedical device. The biomedical device may be an ophthalmic device. The ophthalmic device may be a contact lens. The fuel solution and other solutions within the energization element may comprise one or more of maltodextrin and glucose. There may be numerous seals that are formed within the energization element to isolate the various cavities from each other as well as isolating the material within the energization element from outside the energization element. The seals may be formed between the anode spacer layer and the cathode spacer layer. In some examples, there may be intermediate layers between the anode spacer layer and the cathode spacer layer that are comprised after treatment into the seal. The seal may be formed by one or more of laser welding, ultrasonic welding, and direct thermal welding. The seal may also be formed by photo-patterning of polymer seals.

There may be examples of energization elements as described in the summary that also comprise one or more battery cells. The battery cell may have numerous functional aspects. In some examples, the battery cell may be used with an activation element to begin active operations of the energization element. The activation may include electrically altering a seal between a cavity containing a fuel source and one or more solutions of the energization element which may include an anode solution of the fuel cell. The battery may also operate for a period while the fuel cell begins to reach an operating condition.

BRIEF DESCRIPTION OF THE DRAWINGS

The foregoing and other features and advantages of the invention will be apparent from the following, more particular description of preferred embodiments of the invention, as illustrated in the accompanying drawings.

FIGS. 1A-1D illustrate exemplary aspects of biocompatible energization elements in concert with the exemplary application of contact lenses.

FIG. 3A illustrates a stand-alone, packaged biocompatible energization element with exemplary anode and cathode connections.

FIG. 3B illustrates a stand-alone, packaged biocompatible energization element with exemplary anode and cathode connections.

FIGS. 4A-4N illustrate exemplary method steps for the formation of biocompatible energization elements for biomedical devices.

FIGS. 6A-B illustrate alternative exemplary features of cavity based fuel cells.

FIGS. 9 A-C illustrate exemplary interconnection schemes for exemplary fuel cells.

DETAILED DESCRIPTION OF THE INVENTION

Figure 1C:
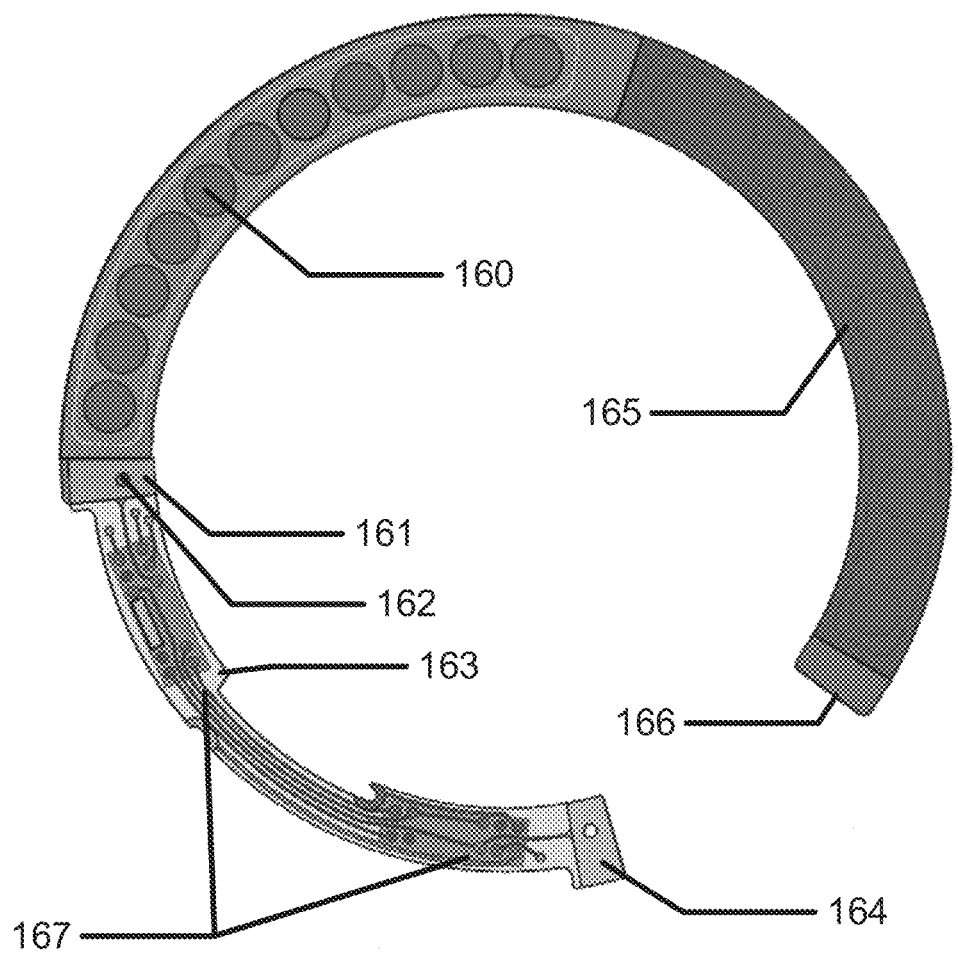

Methods and apparatus to form three-dimensional biocompatible energization elements are disclosed in this application. The membrane element within the energization elements may be formed with novel methods and may comprise novel materials. In the following sections, detailed descriptions of various embodiments are described. The description of both preferred and alternative embodiments are exemplary embodiments only, and various modifications and alterations may be apparent to those skilled in the art. Therefore, the exemplary embodiments do not limit the scope of this application. The three-dimensional biocompatible energization elements are designed for use in or proximate to the body of a living organism.

Glossary

In the description and claims below, various terms may be used for which the following definitions will apply:

"Anode" as used herein refers to an electrode through which electric current flows into a polarized electrical device. The direction of electric current is typically opposite to the direction of electron flow. In other words, the electrons flow from the anode into, for example, an electrical circuit.

"Biocompatible" as used herein refers to a material or device that performs with an appropriate host response in a specific application. For example, a biocompatible device does not have toxic or injurious effects on biological systems.

"Cathode" as used herein refers to an electrode through which electric current flows out of a polarized electrical device. The direction of electric current is typically opposite to the direction of electron flow. Therefore, the electrons flow into the cathode of the polarized electrical device and out of, for example, the connected electrical circuit.

"Coating" as used herein refers to a deposit of material in thin forms. In some uses, the term will refer to a thin deposit that substantially covers the surface of a substrate it is formed upon. In other more specialized uses, the term may be used to describe small thin deposits in smaller regions of the surface.

"Electrode" as used herein can refer to an active mass in the energy source. For example, it may include one or both of the anode and cathode.

"Energized" as used herein refers to the state of being able to supply electrical current or to have electrical energy stored within.

"Energy" as used herein refers to the capacity of a physical system to do work. Many uses of the energization elements may relate to the capacity of being able to perform electrical actions.

"Energy Source" or "Energization Element" or "Energization Device" as used herein refers to any device or layer which is capable of supplying energy or placing a logical or electrical device in an energized state. The energization elements may include fuel cells. The fuel cells can be formed from alkaline type cell chemistry and may be solid-state fuel cells or wet cell fuel cells.

"Film" as used herein refers to a thin layer of a material that may act as a covering or a coating; in laminate structures the film typically approximates a planar layer with a top surface and a bottom surface and a body; wherein the body is typically much thinner than the extent of the layer.

"Functionalized" as used herein refers to making a layer or device able to perform a function including for example, energization, activation, and/or control.

"Mold" as used herein refers to a rigid or semi-rigid object that may be used to form three-dimensional objects from uncured formulations. Some preferred molds include two mold parts that, when opposed to one another, define the structure of a three-dimensional object.

"Power" as used herein refers to work done or energy transferred per unit of time.

"Rechargeable" or "Re-energizable" as used herein refer to a capability of being restored to a state with higher capacity to do work. Many uses may relate to the capability of being restored with the ability to flow electrical current at a certain rate for certain, reestablished time periods.

"Reenergize" or "Recharge" as used herein refer to restoring to a state with higher capacity to do work. Many uses may relate to restoring a device to the capability to flow electrical current at a certain rate for a certain, reestablished time period.

"Released" as used herein and sometimes referred to as "released from a mold" means that a three-dimensional object is either completely separated from the mold, or is only loosely attached to the mold, so that it may be removed with mild agitation.

"Stacked" as used herein means to place at least two component layers in proximity to each other such that at least a portion of one surface of one of the layers contacts a first surface of a second layer. In some embodiments, a coating, whether for adhesion or other functions, may reside between the two layers that are in contact with each other through said coating.

"Traces" as used herein refer to energization element components capable of connecting together the circuit components. For example, circuit traces can include copper or gold when the substrate is a printed circuit board and can typically be copper, gold or printed film in a flexible circuit. A special type of "Trace" is the current collector. Current collectors are traces with electrochemical compatibility that makes the current collector suitable for use in conducting electrons to and from an anode or cathode.

The methods and apparatus presented herein relate to forming biocompatible energization elements for inclusion within or on flat or three-dimensional biocompatible devices.

There may be other examples of how to assemble and configure fuel cells according to the present disclosure, and some may be described in following sections. However, for many of these examples, there are selected parameters and characteristics of the fuel cells that may be described in their own right. In the following sections, some characteristics and parameters will be focused upon.

Exemplary Biomedical Device Construction with Biocompatible Energization Elements An example of a biomedical device that may incorporate the energization elements, fuel cells, of the present disclosure may be an electroactive focal-adjusting contact lens. Referring to FIG. 1A, an example of such a contact lens insert may be depicted as contact lens insert 100. In the contact lens insert 100, there may be an electroactive element 120 that may accommodate focal characteristic changes in response to controlling voltages. A circuit 105 to provide those controlling voltage signals as well as to provide other function such as controlling sensing of the environment for external control signals may be powered by a biocompatible fuel cell element 110. As depicted in FIG. 1A, the fuel cell element 110 may be found as multiple major pieces, in this case three pieces, and may comprise various configurations of fuel cell chemistry elements. The fuel cell elements may have various interconnect features to join together pieces as may be depicted underlying the region of interconnect 114. The fuel cell elements may be connected to a circuit element that may have its own substrate 111 upon which interconnect features 125 may be located. The circuit 105, which may be in the form of an integrated circuit, may be electrically and physically connected to the substrate 111 and its interconnect features 125.

Referring to FIG. 1B, a cross sectional relief of a contact lens 150 may contain contact lens insert 100 and its discussed constituents. The contact lens insert 100 may be encapsulated into a skirt of contact lens hydrogel 155 which may encapsulate the insert and provide a comfortable interface of the contact lens 150 to a user's eye.

Figure 1D:
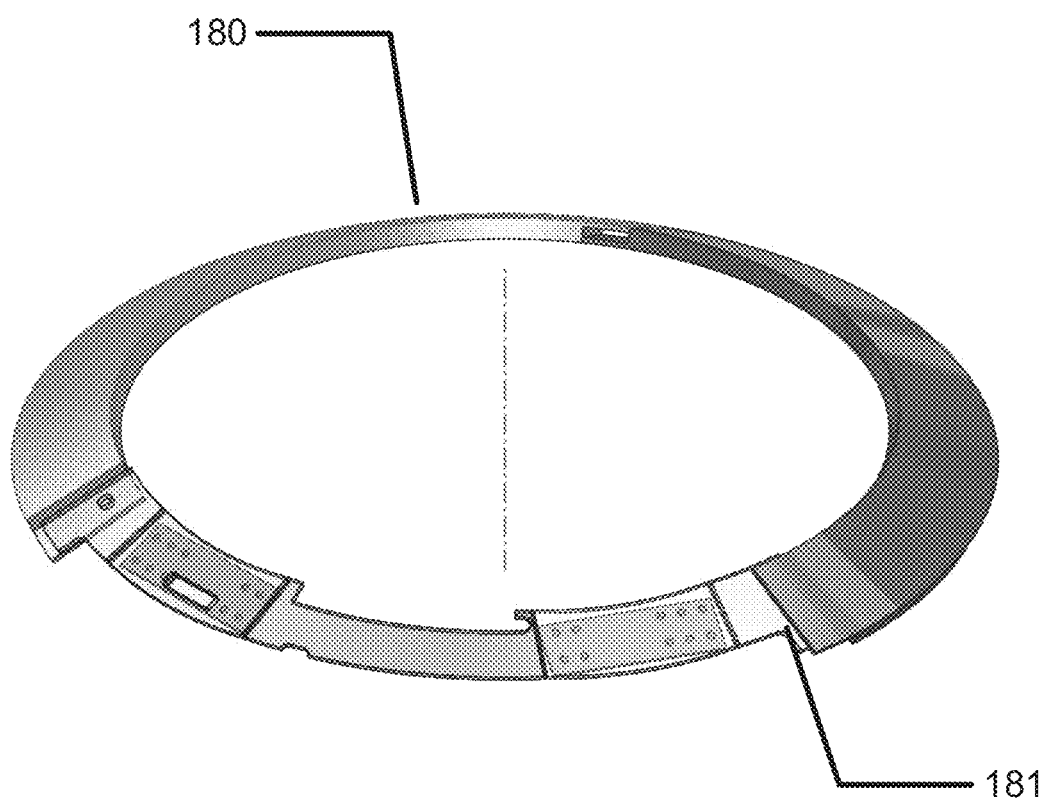

In reference to concepts of the present disclosure, the fuel cell elements may be formed in a two-dimensional form as depicted in another example of FIG. 1C. In this depiction there may be two main regions of fuel cell cells in the regions of fuel cell component 165 and the second fuel cell component in the region of fuel cell chemistry element 160. The flat element may connect to a circuit element 163, which in the example of FIG. 1C may contain two major circuit areas 167. The circuit element may connect to the fuel cell element at an electrical contact 161 and a physical contact 162. The flat structure may be bent into a three-dimensional conical structure as has been described in the present disclosure. In that process a second electrical contact 166 and a second physical contact 164 may be used to connect and physically stabilize the three-dimensional structure. Referring to FIG. 1D, a representation of this three-dimensional conical structure 180 may be found. The physical and electrical contact points 181 may also be found and the illustration may be viewed as a three-dimensional view of the resulting structure. This structure may comprise the modular electrical and fuel cell component that will be incorporated with a lens insert into a biocompatible device.

Segmented Fuel Cell Schemes

Figure 2:
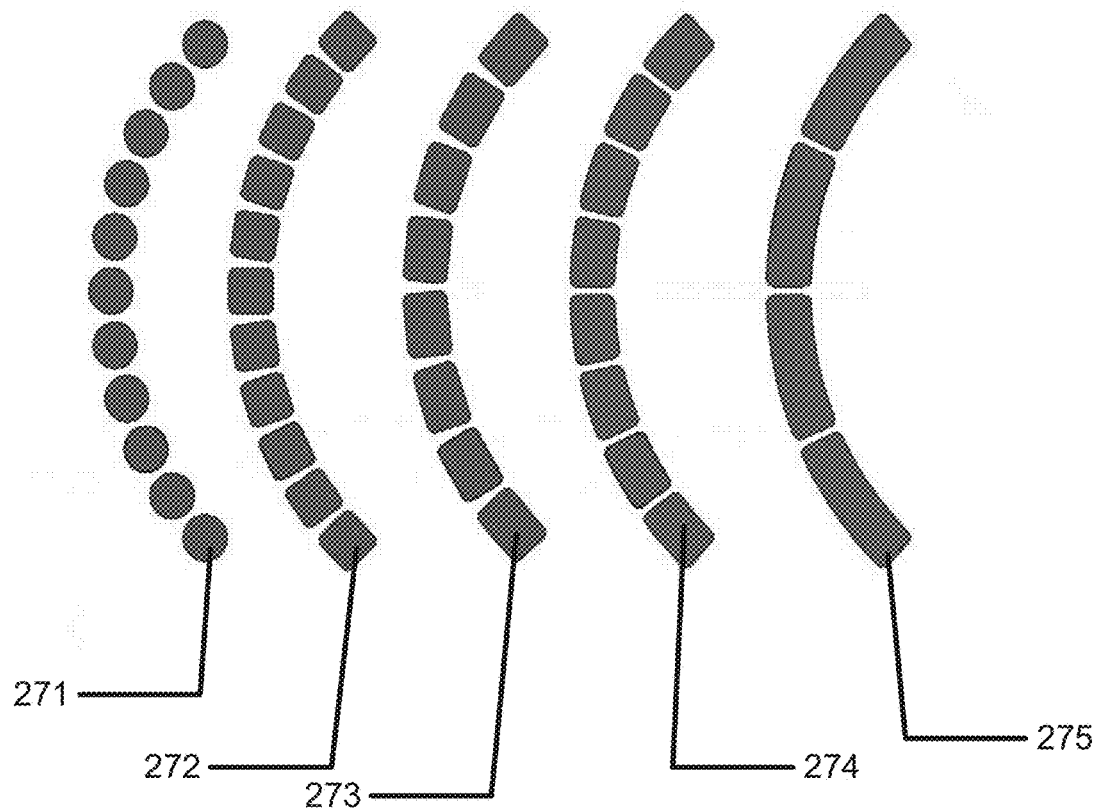
FIG. 2 illustrates exemplary size and shape of individual cells of an exemplary fuel cell design.

Referring to FIG. 2, an example of different types of segmented fuel cell schemes is depicted for an exemplary fuel cell element for a contact lens type example. The segmented components may be relatively circular-shaped 271, square-shaped 272 or rectangular-shaped. In rectangular-shaped examples, the rectangles can be small rectangular shapes 273, larger rectangular shapes 274, or large rectangular shapes 275. These different types of segmenting provide design tradeoffs for parameters of the fuel cell such as capacity, internal resistance, manufacturability, voltage capability, defect resistance and packaging.

Custom Shapes of Flat Fuel Cell Elements

In some examples of biocompatible fuel cells, the fuel cells may be formed as flat elements. Referring to FIG. 3A an example of a rectangular outline 310 of the fuel cell element may be depicted with an anode connection 311 and a cathode connection 312. Referring to FIG. 3B an example of a circular outline 330 of a fuel cell element may be depicted with an anode connection 331 and a cathode connection 332.

In some examples of flat-formed fuel cells, the outlines of the fuel cell form may be dimensionally and geometrically configured to fit in custom products. In addition to examples with rectangular or circular outlines, custom "free-form" or "free shape" outlines may be formed which may allow the fuel cell configuration to be optimized to fit within a given product.

In the exemplary biomedical device case of a variable optic, a "free-form" example of a flat outline may be arcuate in form; the free form may be of such geometry that when formed to a three-dimensional (3D) shape, it may take the form of a conical, annular skirt that fits within the constraining confines of a contact lens. It may be clear that similar beneficial geometries may be formed where medical devices have restrictive two-dimensional (2D) or 3D shape requirements.

Biocompatibility Aspects of Fuel Cells

As an example, the fuel cells according to the present disclosure may have important aspects relating to safety and biocompatibility. In some examples, fuel cells for biomedical devices may need to meet requirements above and beyond those for typical fuel cell usage scenarios. In some examples, design aspects may be considered related to stressing events. For example, the safety of an electronic contact lens may need to be considered in the event a user breaks the lens during insertion or removal. In another example, design aspects may consider the potential for a user to be struck in the eye by a foreign object. Still further examples of stressful conditions that may be considered in developing design parameters and constraints may relate to the potential for a user to wear the lens in challenging environments like the environment under water or the environment at high altitude in non-limiting examples.

The safety of such a device may be influenced by the materials that the device is formed with, by the quantities of those materials employed in manufacturing the device, and also by the packaging applied to separate the devices from the surrounding on- or in-body environment. In an example, pacemakers may be a typical type of biomedical device which may include a fuel cell and which may be implanted in a user for an extended period of time. Accordingly, in some examples, such pacemakers may typically be packaged with welded, hermetic titanium enclosures, or in other examples, multiple layers of encapsulation. Emerging powered biomedical devices may present new challenges for packaging, especially fuel cell packaging. These new devices may be much smaller than existing biomedical devices, for example, an electronic contact lens or pill camera may be significantly smaller than a pacemaker. In such examples, the volume and area available for packaging may be greatly reduced.

Electrical Requirements of Micro-Energization Elements

Another area for design considerations may relate to electrical requirements of the device upon the fuel cell device. In order to function as a power source for a medical device, an appropriate fuel cell may need to meet the full electrical requirements of the system when operating in a non-connected or non-externally powered mode. An emerging field of non-connected or non-externally powered biomedical devices may include, for example, vision-correcting contact lenses, health monitoring devices, pill cameras, and novelty devices. Recent developments in integrated circuit (IC) technology may permit meaningful electrical operation at very low current levels, for example, picoamps of standby current and microamps of operating current. IC's may also permit very small devices.

Micro-fuel cells for biomedical applications may be required to meet many simultaneous, challenging requirements. For example, the micro-fuel cell may be required to have the capability to deliver a suitable operating voltage to an incorporated electrical circuit. This operating voltage may be influenced by several factors including the IC process "node," the output voltage from the circuit to another device, and a particular current consumption target which may also relate to a desired device lifetime.

With respect to the IC process, nodes may typically be differentiated by the minimum feature size of a transistor, such as its "so-called" transistor channel. This physical feature, along with other parameters of the IC fabrication, such as gate oxide thickness, can be associated with a resulting rating standard for turn-on, or threshold, voltages of field-effect transistors (FET's) fabricated in the given process node. For example, in a node with a minimum feature size of 0.5 microns it may be common to find FET's with turn-on voltages of 5.0 V. However, at a minimum feature size of 90 nm the FET's may turn-on at 1.2, 1.8, or 2.5 V. The IC foundry may supply standard cells of digital blocks, for example, inverters and flip-flops that have been characterized and are rated for use over certain voltage ranges. Designers chose an IC process node based on several factors including density of digital devices, analog/digital mixed signal devices, leakage current, wiring layers, and availability of specialty devices such as high-voltage FET's. Given these parametric aspects of the electrical components which may draw power from a micro-fuel cell, it may be important for the micro-fuel cell power source to be matched to the requirements of the chosen process node and IC design especially in terms of available voltage and current.

In some examples, an electrical circuit powered by a micro-fuel cell, may connect to another device. In non-limiting examples, the micro-fuel cell powered electrical circuit may connect to an actuator or a transducer. Depending on the application these may include a light-emitting diode (LED), a sensor, a microelectromechanical system (MEMS) pump, or numerous other such devices. In some examples, such connected devices may require higher operating voltage conditions than common IC process nodes, for example, a variable-focus lens may require 35 V to activate. The operating voltage provided by the fuel cell may therefore be a critical consideration when designing such a system. In some examples of this type of consideration, the efficiency of a lens driver to produce 35 V from a 1 V fuel cell may be significantly less than it might be when operating from a 2 V fuel cell. Further requirements such as die size may be dramatically different considering the operating parameters of the micro-fuel cell as well.

Individual fuel cell cells may typically be rated with open-circuit, loaded, and cutoff voltages. The open-circuit voltage is the potential produced by the fuel cell with infinite load resistance. The loaded voltage is the potential produced by the cell with an appropriate, and typically also specified, load impedance placed across the cell terminals. In some examples, capacitors or batteries may supplement the fuel cell and may be used to buffer temporary and dynamic load conditions where the power density of a fuel cell may be insufficient.

Shelf life typically refers to the period of time which a fuel cell may survive in storage and still maintain useful operating parameters. Shelf life may be particularly important for biomedical devices for several reasons. Electronic devices may displace non-powered devices, as for example may be the case for the introduction of an electronic contact lens. Products in these existing market spaces may have established shelf life requirements, for example, three years, due to customer, supply chain, and other requirements. It may typically be desired that such specifications not be altered for new products. Shelf life requirements may also be set by the distribution, inventory, and use methods of a device comprising a micro-fuel cell. Accordingly, micro-fuel cells for biomedical devices may have specific shelf life requirements, which may be measured in the number of years for example.

In some examples, a fuel cell may function to provide the electrical energy for an electrical system. In these examples, the fuel cell may be electrically connected to the circuit of the electrical system. The connections between a circuit and a fuel cell may be classified as interconnects. These interconnects may become increasingly challenging for biomedical micro-fuel cells due to several factors. In some examples, powered biomedical devices may be very small thus allowing little area and volume for the interconnects. The restrictions of size and area may impact the electrical resistance and reliability of the interconnections.

In other respects, a fuel cell may contain liquids which could boil at high temperature. This restriction may directly compete with the desire to use a solder interconnect which may, for example, require relatively high temperatures such as 250 degrees C. to melt. Although in some examples the fuel cell chemistry and the heat source used to form solder based interconnects may be isolated spatially from each other, in the cases of emerging biomedical devices, the small size may preclude the separation of aqueous solutions and solder joints by sufficient distance to reduce heat conduction.

Interconnects

Interconnects may allow current to flow from the fuel cell in connection with an external circuit. Such interconnects may interface with the environments inside and outside the fuel cell, and may cross the boundary or seal between those environments. These interconnects may be considered as traces, making connections to an external circuit, passing through the fuel cell seal, and then connecting to the current collectors inside the fuel cell. As such, these interconnects may have several requirements. Outside the fuel cell, the interconnects may resemble typical printed circuit traces. They may be soldered to or otherwise connect to other traces. In an example where the fuel cell is a separate physical element from a circuit board containing an integrated circuit, the fuel cell interconnect may allow for connection to the external circuit. This connection may be formed with solder, conductive tape, conductive ink or epoxy, or other means. The interconnect traces may need to survive in the environment outside the fuel cell, for example not corroding in the presence of oxygen.

As the interconnect passes through the fuel cell seal, it may be of critical importance that the interconnect coexist with the seal and permit sealing. Adhesion may be required between the seal and interconnect in addition to the adhesion which may be required between the seal and fuel cell package. Seal integrity may need to be maintained in the presence of aqueous solutions and other materials inside the fuel cell. Interconnects, which may typically be metallic, may be known as points of failure in fuel cell packaging. The electrical potential and/or flow of current may increase the tendency for solutions within the fuel cell to "creep" along the interconnect. Accordingly, an interconnect may need to be engineered to maintain seal integrity.

Inside the fuel cell, the interconnects may interface with the current collectors or may actually form the current collectors. In this regard, the interconnect may need to meet the requirements of the current collectors as described herein, or may need to form an electrical connection to such current collectors.

One class of candidate interconnects and current collectors is metal foils. Such foils are available in thickness of 25 microns or less, which make them suitable for very thin fuel cells. Such foil may also be sourced with low surface roughness and contamination, two factors which may be critical for fuel cell performance. The foils may include zinc, nickel, brass, copper, titanium, other metals, and various alloys. Metal foils may also have coatings of various types that may be applied to their surfaces. In an example, a carbon or graphite coating may be applied to a copper foil, wherein the coating may be a conductive film with a rough surface topology which may increase surface area of the electrode to adjacent solutions. Furthermore, the coating may provide a barrier of various kinds between adjacent solutions and the metal films, which may have different aspect of chemical reactivity. There may be numerous films and coating applied to the electrode foils.

Modular Fuel Cell Components

In some examples, a modular fuel cell component may be formed according to some aspects and examples of the present disclosure. In these examples, the modular fuel cell assembly may be a separate component from other parts of the biomedical device. In the example of an ophthalmic contact lens device, such a design may comprise a modular fuel cell that is separate from the rest of a media insert. There may be numerous advantages of forming a modular fuel cell component. For example, in the example of the contact lens, a modular fuel cell component may be formed in a separate, non-integrated process which may alleviate the need to handle rigid, 3D-formed optical plastic components. In addition, the sources of manufacturing may be more flexible and may operate in a more parallel mode to the manufacturing of the other components in the biomedical device. Furthermore, the fabrication of the modular fuel cell components may be decoupled from the characteristics of 3D-shaped devices. For example, in applications requiring three-dimensional final forms, a modular fuel cell system may be fabricated in a flat or roughly two-dimensional perspective and then shaped to the appropriate three-dimensional shape. A modular fuel cell component may be tested independently of the rest of the biomedical device, and yield loss due to fuel cell components may be sorted before assembly. The resulting modular fuel cell component may be utilized in various media insert constructs that do not have an appropriate rigid region upon which the fuel cell components may be formed, and, in a still further example, the use of modular fuel cell components may facilitate the use of different options for fabrication technologies than would otherwise be utilized, for example, web-based technology (roll to roll), sheet-based technology (sheet-to-sheet), printing, and lithography processing. In some examples of a modular fuel cell, the discrete containment aspect of such a device may result in additional material being added to the overall biomedical device construct. Such effects may set a constraint for the use of modular fuel cell solutions when the available space parameters require minimized thickness or volume of solutions.

In some of the examples of the fuel cell applications in the present disclosure where the fuel cell may be employed in a variable optic lens, the form factor may require a three-dimensional curvature of the fuel cell component where a radius of that curvature may be on the order of approximately 8.4 mm. The nature of such a curvature may be considered to be relatively steep and for reference may approximate the type of curvature found on a human fingertip. The nature of a relative steep curvature creates challenging aspects for manufacture. In some examples of the present disclosure, a modular fuel cell component may be designed such that it may be fabricated in a flat, two-dimensional manner and then formed into a three-dimensional form of relative high curvature.

Fuel Cell Module Thickness

In designing fuel cell components for biomedical applications, tradeoffs amongst the various parameters may be made balancing technical, safety and functional requirements. The thickness of the fuel cell component may be an important and limiting parameter. For example, in an optical lens application the ability of a device to be comfortably worn by a user may have a critical dependence on the thickness across the biomedical device. Therefore, there may be critical enabling aspects in designing the fuel cell for thinner results. In some examples, fuel cell thickness may be determined by the combined thicknesses of top and bottom sheets, spacer sheets, and adhesive layer thicknesses. Practical manufacturing aspects may drive certain parameters of film thickness to standard values in available sheet stock. In addition, the films may have minimum thickness values to which they may be specified base upon technical considerations relating to chemical compatibility, moisture/gas impermeability, surface finish, and compatibility with coatings that may be deposited upon the film layers.

In some examples, a desired or goal thickness of a finished fuel cell component may be a component thickness that is less than 220 µm. In these examples, this desired thickness may be driven by the three-dimensional geometry of an exemplary ophthalmic lens device where the fuel cell component may need to be fit inside the available volume defined by a hydrogel lens shape given end user comfort, biocompatibility, and acceptance constraints. This volume and its effect on the needs of fuel cell component thickness may be a function of total device thickness specification as well as device specification relating to its width, cone angle, and inner diameter. Another important design consideration for the resulting fuel cell component design may relate to the volume available for active fuel cell chemicals and materials in a given fuel cell component design with respect to the resulting chemical energy that may result from that design. This resulting chemical energy may then be balanced for the electrical requirements of a functional biomedical device for its targeted life and operating conditions.

Fuel Cell Module Flexibility

Another dimension of relevance to fuel cell design and to the design of related devices that utilize fuel cell based energy sources is the flexibility of the fuel cell component. There may be numerous advantages conferred by flexible fuel cell forms. For example, a flexible fuel cell module may facilitate the previously mentioned ability to fabricate the fuel cell form in a two-dimensional flat form. The flexibility of the form may allow the two-dimensional fuel cell to then be formed into an appropriate three-dimensional shape to fit into a biomedical device such as a contact lens.

In another example of the benefits that may be conferred by flexibility in the fuel cell module, if the fuel cell and the subsequent device is flexible then there may be advantages relating to the use of the device. In an example, a contact lens form of a biomedical device may have advantages for insertion/removal of the media insert based contact lens that may be closer to the insertion/removal of a standard, non-filled hydrogel contact lens. Furthermore, flexibility of the fuel cell module and associated biomedical devices may allow for important advantages to the use of these devices. As a non-limiting example, an intraocular lens may provide an example of a biomedical device using a flexible fuel cell module since a typical insertion of such a lens during a surgical procedure may place a folded lens body through a small incision before unfolding it into place. For this type of surgery and others, a smaller incisions site may result in improved results, quicker healing and other such benefits.

The number of flexures may be important to the engineering of the fuel cell. For example, a fuel cell which may only flex one time from a planar form into a shape suitable for a contact lens may have significantly different design from a fuel cell capable of multiple flexures. The flexure of the fuel cell may also extend beyond the ability to mechanically survive the flexure event. For example, an electrode may be physically capable of flexing without breaking, but the mechanical and electrochemical properties of the electrode may be altered by flexure. Flex-induced changes may appear instantly, for example as changes to impedance, or flexure may introduce changes which are only apparent in long-term shelf life testing.

Fuel Cell Module Width

There may be numerous applications into which the biocompatible energization elements or fuel cells of the present disclosure may be utilized. In general, the fuel cell width requirement may be largely a function of the application in which it is applied. In an exemplary case, a contact lens fuel cell system may have constrained needs for the specification on the width of a modular fuel cell component. In some examples of an ophthalmic device where the device has a variable optic function powered by a fuel cell component, the variable optic portion of the device may occupy a central spherical region of about 7.0 mm in diameter. The exemplary fuel cell elements may be considered as a 3-dimensional object, which fits as an annular, conical skirt around the central optic and formed into a truncated conical ring. If the required maximum diameter of the rigid insert is a diameter of 8.50 mm, and tangency to a certain diameter sphere may be targeted (as for example in a roughly 8.40 mm diameter), then geometry may dictate what the allowable fuel cell width may be. There may be geometric models that may be useful for calculating desirable specifications for the resulting geometry which in some examples may be termed a conical frustum flattened into a sector of an annulus.

Flattened fuel cell width may be driven by two features of the fuel cell element, the active fuel cell components and seal width. In some examples relating to ophthalmic devices a target thickness may be between 0.100 mm and 0.500 mm per side, and the active fuel cell components may be targeted at roughly 0.800 mm wide. Other biomedical devices may have differing design constraints but the principles for flexible flat fuel cell elements may apply in similar fashion.

Cavities as Design Elements in Fuel Cell Component Design

In some examples, fuel cell elements may be designed in manners that segment the regions of active fuel cell chemistry. There may be numerous advantages from the division of the active fuel cell components into discrete segments. In a non-limiting example, the fabrication of discrete and smaller elements may facilitate production of the elements. The function of fuel cell elements including numerous smaller elements may be improved. Defects of various kinds may be segmented and non-functional elements may be isolated in some cases to result in decreased loss of function. This may be relevant in examples where the loss of fuel cell solution may occur. The isolation of individualized components may allow for a defect that results in leakage of fluids out of the critical regions of the fuel cell to limit the loss of function to that small segment of the total fuel cell element whereas the fluid loss through the defect could empty a significantly larger region for fuel cells configured as a single cell. Smaller cells may result in lowered volume of active fuel cell chemicals on an overall perspective, but the mesh of material surrounding each of the smaller cells may result in a strengthening of the overall structure.

Pressure-Sensitive Adhesive

In some examples, the plurality of components comprising the laminar micro-fuel cells of the present disclosure may be held together with a pressure-sensitive adhesive (PSA) that also serves as a sealant. As set forth below, alternatives to pressure sensitive adhesives may be utilized. While a myriad of commercially available pressure sensitive adhesive formulations may exist, such formulations may include components that may make them unsuitable for use within a biocompatible laminar micro-fuel cell. Examples of undesirable components in pressure sensitive adhesives may include low molecular mass leachable components, antioxidants e.g. BHT and/or MEHQ, plasticizing oils, impurities, oxidatively unstable moieties containing, for example, unsaturated chemical bonds, residual solvents and/or monomers, polymerization initiator fragments, polar tackifiers, and the like.

Suitable PSAs may on the other hand exhibit the following properties. They may be able to be applied to laminar components to achieve thin layers on the order of 2 to 20 microns. As well, they may contain a minimum of, preferably zero, undesirable or non-biocompatible components. Additionally, they may have sufficient adhesive and cohesive properties so as to bind the components of the laminar fuel cell together. And, they may be able to flow into the micron-scale features inherent in devices of the present construction while providing for a robust sealing of fluids within the fuel cell. In some examples of suitable PSAs, the PSAs may have a low permeability to water vapor in order to maintain a desirable aqueous solution composition within the fuel cell even when the fuel cell may be subjected to extremes in humidity for extended periods of time.

In consideration of these requirements, polyisobutylene (PIB) may be a commercially-available material that may be formulated into PSA compositions meeting many if not all desirable requirements. Furthermore, PIB may be an excellent barrier sealant with very low water absorbance and low oxygen permeability. An example of PIB useful in the examples of the present disclosure may be Oppanol B15 by BASF Corporation. Oppanol B15 may be dissolved in hydrocarbon solvents such as toluene, dodecane, mineral spirits, and the like. A preferred PSA composition may comprise 30% Oppanol B15 (w/w) in a solvent mixture comprising 70% (w/w) toluene and 30% dodecane. The adhesive and rheological properties of PIB based PSA's may be determined in some examples by the blending of different molecular mass grades of PIB. A common approach may be to use a majority of low molar mass PIB, e.g. Oppanol B10 to effect wetting, tack, and adhesion, and to use a minority of high molar mass PIB to effect toughness and resistance to flow. Consequently, blends of any number of PIB molar mass grades may be envisioned and may be practiced within the scope of the present disclosure. Furthermore, tackifiers may be added to the PSA formulation so long as the aforementioned requirements may be met. By their very nature, tackifiers impart polar properties to PSA formulations, so they may need to be used with caution so as to not adversely affect the barrier properties of the PSA. Furthermore, tackifiers may in some cases be oxidatively unstable and may include an antioxidant, which could leach out of the PSA. For these reasons, preferred tackifiers for use in PSA's for biocompatible laminar micro fuel cells may include fully- or mostly hydrogenated hydrocarbon resin tackifiers such as the Regalrez series of tackifiers from Eastman Chemical Corporation.

In numerous examples herein, examples of processing may include the use of a pressure sensitive adhesive. In many cases other types of adhesion or sealing may be employed in similar manners with similar results. In some examples, additional processing to that used to adhere parts together may be employed to increase the ability of the adhered surfaces to be sealed. For example, laser welding may join or further support sealing. In other examples, ultrasonic welding or thermal welding may be used to support sealing aspects. Still further examples may include photo-patterned polymer seals. In some examples a work piece may be assembled into a general structure with the use of pressure sensitive adhesives and then after a number of structural elements have been joined, additional processing may ensure to enhance or define appropriate sealing surfaces.

Additional Package and Substrate Considerations in Biocompatible Fuel Cell Modules There may be numerous packaging and substrate considerations that may dictate desirable characteristics for package designs used in biocompatible laminar micro fuel cells. For example, the packaging may desirably be predominantly foil and/or film based where these packaging layers may be as thin as possible, for example, 10 to 50 microns. Additionally, the packaging may provide a sufficient diffusion barrier to moisture gain or loss during the shelf life. In many desirable examples, the packaging may provide a sufficient diffusion barrier to oxygen ingress.

In some examples, the packaging may provide a finite permeation pathway to any gasses that may evolve.

In some examples, top and bottom packaging layers may comprise metallic foils or polymer films. In some examples, such polymer films may themselves be coated in numerous manners including in a non-limiting sense to be evaporated, sputtered or coated in other manners by layers of metallic compounds or elements or other non-metallic compounds such as silicon dioxide for example. Top and bottom packaging layers may be comprised of multi-layer film constructs containing a plurality of polymer and/or barrier layers. Such film constructs may be referred to as coextruded barrier laminate films. An example of a commercial coextruded barrier laminate film of particular utility in the present disclosure may be 3M Scotchpak 1109 backing which consists of a PET carrier web, a vapor-deposited aluminum barrier layer, and a polyethylene layer comprising a total average film thickness of 33 microns. Numerous other similar multilayer barrier films may be available and may be used in alternate examples of the present disclosure.

In design constructions comprising a PSA, packaging layer surface roughness may be of particular importance, because the PSA may also need to seal opposing packaging layer faces. Surface roughness may result from manufacturing processes used in foil and film production, for example processes employing rolling, extruding, embossing and/or calendaring, among others. If the surface is too rough, PSA may be not able to be applied in a uniform thickness when the desired PSA thickness may be on the order of the surface roughness Ra. Furthermore, PSA's may not adequately seal against an opposing face if the opposing face has roughness that may be on the order of the PSA layer thickness. In the present disclosure, packaging materials having a surface roughness, Ra, less than 10 microns may be acceptable examples. In some examples, surface roughness values may be 5 microns or less. And, in still further examples, the surface roughness may be 1 micron or less. Surface roughness values may be measured by a variety of methods including but not limited to measurement techniques such as white light interferometry, stylus profilometry, and the like. There may be many examples in the art of surface metrology that surface roughness may be described by a number of alternative parameters and that the average surface roughness, Ra, values discussed herein may be meant to be representative of the types of features inherent in the aforementioned manufacturing processes.

Fuel Cell Architecture and Fabrication

Fuel cell architecture and fabrication technology may be closely intertwined. As has been discussed in earlier sections of the present disclosure, a fuel cell has the following elements: a cathode region with an inert electrode, an anode typically with enzymes for catalysis of the fuel cell reaction, a fuel source, and a membrane which may be called an electrolyte, a cathode current collector, an anode current collector, and packaging. In some examples, the design may have dual-use components, for example, the process of using a metal package to double as a current collector. From a relative volume and thickness standpoint, these elements may be nearly all the same volume, except for the cathode and fuel source.

In these examples, the relative scale of the various components may be approximated in the following thicknesses of the elements: Anode current collector=1 µm; Cathode current collector=1 µm; Membrane/Electrolyte=as thin or thick as effective for isolation of gaseous compounds and effective for diffusion of ionic species where the planned thickness may be approximately 10 µm; Anode cavity thickness=50 µm; fuel cell cavity thickness approximately 50-60 µm and the Cathode=5 µm. For these examples of elements the packaging needed to provide sufficient protection to maintain fuel cell chemistry in use environments may have a planned maximal thickness of approximately 50 µm.

In some examples, which may be fundamentally different from large, prismatic constructs such as cylindrical or rectangular forms and which may be different than wafer-based solid state construct, such examples may assume a "pouch"-like construct, using webs or sheets fabricated into various configurations, with fuel cell elements arranged inside. The containment may have two films or one film bended over onto the other side either configuration of which may form two roughly planar surfaces, which may be then sealed on the perimeter to form a container. This thin-but-wide form factor may make fuel cell elements themselves thin and wide. Furthermore, these examples may be suitable for application through coating, gravure printing, screen printing, sputtering, or other similar fabrication technology.

In some examples, the processing of the fuel cell structure may be classified as laminate assembly, which may involve using films, either in a web or sheet form, to build up a fuel cell layer by layer. Sheets can be bonded to each other using adhesives, such as pressure-sensitive adhesives, thermally activated adhesives, or chemical reaction-based adhesives. In some examples the sheets can be bonded by welding techniques such as thermal welding, ultrasonic welding and the like. Sheets may lend themselves to standard industry practices as roll-to-roll (R2R), or sheet-to-sheet assembly. As indicted earlier, an interior volume for the fuel may need to be substantially larger than the other active elements in the fuel cell. Much of a fuel cell construct may have to create the space for the fuel, and support it from migration during flexing of the fuel cell. Another portion of the fuel cell construct that may consume significant portions of the thickness budget may be the membrane material. In some examples, a sheet form of membrane may create an advantageous solution for laminate processing. In other examples, the membrane may be formed by dispensing polymer material into a layer to act as the membrane. For the sheet membrane approach, another laminate layer may be introduced to contain this element. For a dispensed polymer membrane, the thickness of the formed device may increase in order to accommodate and contain the necessary spacer material volume to contain the membrane.

In these laminate fuel cell assembly examples, the product may have an anode sheet, which may be a combination of a package layer and an anode current collector, as well as substrate for the anode layer. The forming product may also have an optional membrane spacer sheet, a cathode spacer sheet, and a cathode sheet. The cathode sheet may be a combination of a package layer and a cathode current collector layer.

Intimate contact between electrodes and current collectors is of critical importance for reducing impedance and increasing discharge capacity. If portions of the electrode are not in contact with the current collector, resistance may increase since conductivity is then through the electrode (typically less conductive than the current collector) or a portion of the electrode may become totally disconnected. An embossing step may be performed after assembly of the laminar stack, introducing compression into the stack.

Exemplary Illustrated Processing of Fuel Cells—Placed Membrane

An example of the steps that may be involved in processing fuel cell elements may be found referring to FIGS. 4A-4N. The processing at some of the exemplary steps may be found in the individual figures. In FIG. 4A, a combination of a PET Anode Spacer 401 and a PET Cathode Spacer 404 is illustrated. The PET Anode Spacer 401 may be formed by applying films of PET 403 which, for example, may be roughly 3 mils thick. In some examples, two PET layers may surround a metal sealed cavity 407 between the two layers. The metal seal may include electrical connecting layers within the space between the PET layers to allow for electrically driven removal of the metal seal. On either side of the PET layer may be found PSA layers or these may be capped with a polyvinylidene fluoride (PVDF) release layer 402 which may be roughly 1 mil in thickness. The PET Cathode Spacer 404 may be formed of a PVDF layer 409 which may be roughly 3 mils of thickness. There may be a capping PET layer 405 which may be roughly 0.5 mils in thickness. Between the PVDF layer 409 and the capping PET layer 405, in some examples, may be a layer of PSA.

Proceeding to FIG. 4B, a hole 406 in the Cathode Spacer layer 404 may be cut by laser cutting treatment. Next at FIG. 4C, the cut PET Cathode Spacer layer may be laminated 408 to the PET Anode Spacer layer 401. Proceeding to FIG. 4D, a cathode spacer hole 410 and a fuel cavity hole 411 may be cut by laser cutting treatment. The alignment of this cutting step may be registered to the previously cut features in the PET Cathode Spacer layer 404. At FIG. 4E, a layer of membrane 412, may be bonded to a carrier 413. Proceeding to FIG. 4F, the membrane material may be cut to figures that are between the size of the previous two laser-cut holes surrounding the cathode and anode cavities, and approximately the size of the PET Cathode Spacer hole, forming a precut membrane 420. Proceeding to FIG. 4G, a pick and place tool 421 may be used to pick and place discrete pieces of membrane into their desired locations on the growing device. At FIG. 4H, the placed membrane pieces 422 are fastened into place. A cavity solution 423, which may be a slurry of ice in some examples, may be filled into the cathode cavity. If the cavity solution 423 is in liquid form, the filling may occur with the layers inverted from the depicted direction. Proceeding to FIG. 4I, the growing device structure may be bonded to a cathode contact 425.

Proceeding to FIG. 4J, a mixture of the fuel for the fuel cell may be added to the anode cavity 430 and the fuel cavity 432. A squeegee 431 may be used in some examples to spread the cathode mix across a work piece and in the process fill the gaps of the fuel cell devices being formed. After filling, the remaining PVDF release layer 433 may be removed which may result in the structure transformation illustrated from FIG. 4K to 4L. At FIG. 4L additional materials 440 such as enzymes and buffers may be added to the anode cavity to also be at the height of the PET layer top. In some examples, the enzymes included in the anode cavity may include glucose-6-phosphate dehydrogenase, α-glucan phosphorylase, phosphoglucomutase, and 6-phosphogluconate dehydrogenase as well as other examples of enzymes. Proceeding to FIG. 4M, an anode contact layer 450 which may include a bound layer of enzymes on an anode 451, may be bonded to the growing structure. In a final illustration at FIG. 4N a laser cutting process may be performed to remove side regions 460 and yield a fuel cell element. There may be numerous alterations, deletions, changes to materials and thickness targets that may be useful within the intent of the present disclosure.

Fuel Cell Elements

The laminate layer based cavity approaches may be useful in forming a fuel cell. An energization element with fuel cells may utilize the cavity approach described in the present disclosure and may include multiple cavities, with a number of cavities being a cathode, anode, or fuel source. A cathode cavity may contain a cathode fluid composition. An anode cavity may contain an anode fluid composition which may contain a number of enzymes to facilitate catabolic oxidation of a fuel source. A fuel source cavity may contain a fuel source for the fuel cell. This fuel source may include a hydrocarbon biofuel such as glucose or maltodextrin, as non-limiting examples. The membrane layers of these cavities, which may also be called the electrolyte, keep the reaction intermediaries from each other while allowing small ionic species such as hydrogen ions to diffuse across the electrolyte region. The electrolyte may include different materials, including semi-permeable materials, as a non-limiting example. In some examples, the energization element may include both fuel cells as well as battery elements. The battery elements may be useful to activate the fuel cell for use conditions and may allow fuel to flow into the fuel cell from a storage location.

Figure 5A:
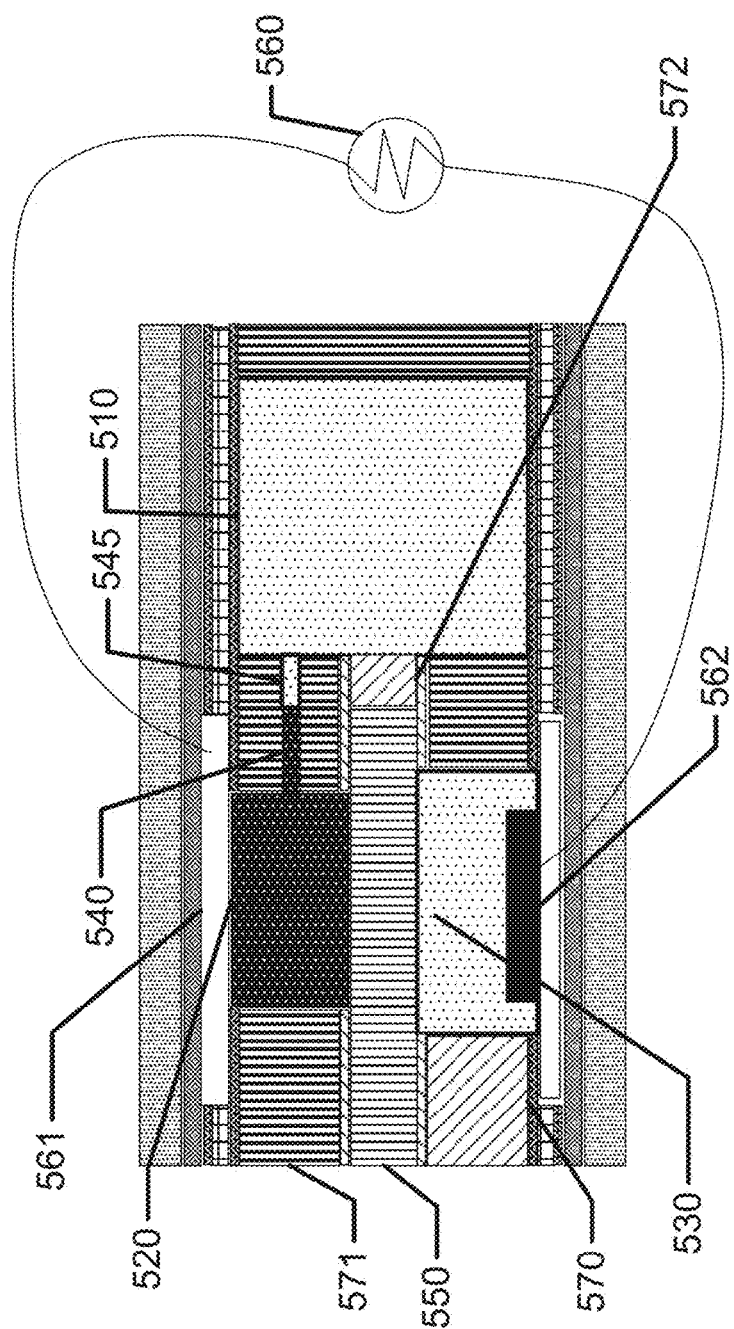
FIGS. 5A-B illustrate exemplary features of cavity based fuel cells.

Referring now to FIG. 5A, a cavity-based fuel cell may have three main cavities for operation: a fuel source cavity 510, an anode cavity 520, and a cathode cavity 530. In some examples a single cavity may have a stacked implementation with the one or more of the anode, cathode and fuel source cavity occupying a single cavity with intervening layers separating the different functions. The interaction and interconnection of these cavities or elements in a cavity may allow for the functioning as a fuel cell. The fuel source cavity 510 and anode cavity 520 may be connected by means of a bridge 540 between the two cavities that contains a gate 545 to separate the two cavities until it may be opened upon desired operation of the cavity fuel cell. The anode cavity 520 and cathode cavity 530 may be separated by a semi-permeable membrane or electrolyte 550 that separates the general contents of each cavity, but may allow the transfer of protons from the anode cavity 520 to the cathode cavity 530, as may be necessary for the functioning of the cavity fuel cell. The anode cavity 520 and cathode cavity 530 may be connected by an external circuit 560 that may utilize the energy released in reactions within the fuel cell. Interconnections may facilitate the transfer of electrons from an electrode 561 in the anode cavity 520 to an electrode 562 in the cathode cavity 530, as may be necessary for the functioning of the cavity fuel cell. There may be numerous examples of materials and processing related to cavity-based processing discussed earlier in this specification in relationship to fuel cells that may be employed. It may be apparent in some examples, that the anode cavity may contain the fuel source without an additional fuel source cavity being employed.

In some examples of fuel cells, the effective surface areas of the electrodes in the anode and cathode may be important factors in the performance of the fuel cells. High surface area platinum based electrodes may be utilized in some examples. Other examples of forming high surface area films such as texturing of a surface physically, growing dendritic features of high surface area, electroplating, sputter coating, laser milling, chemical etching, and other such examples may provide desirable electrodes.

Figure 5B:
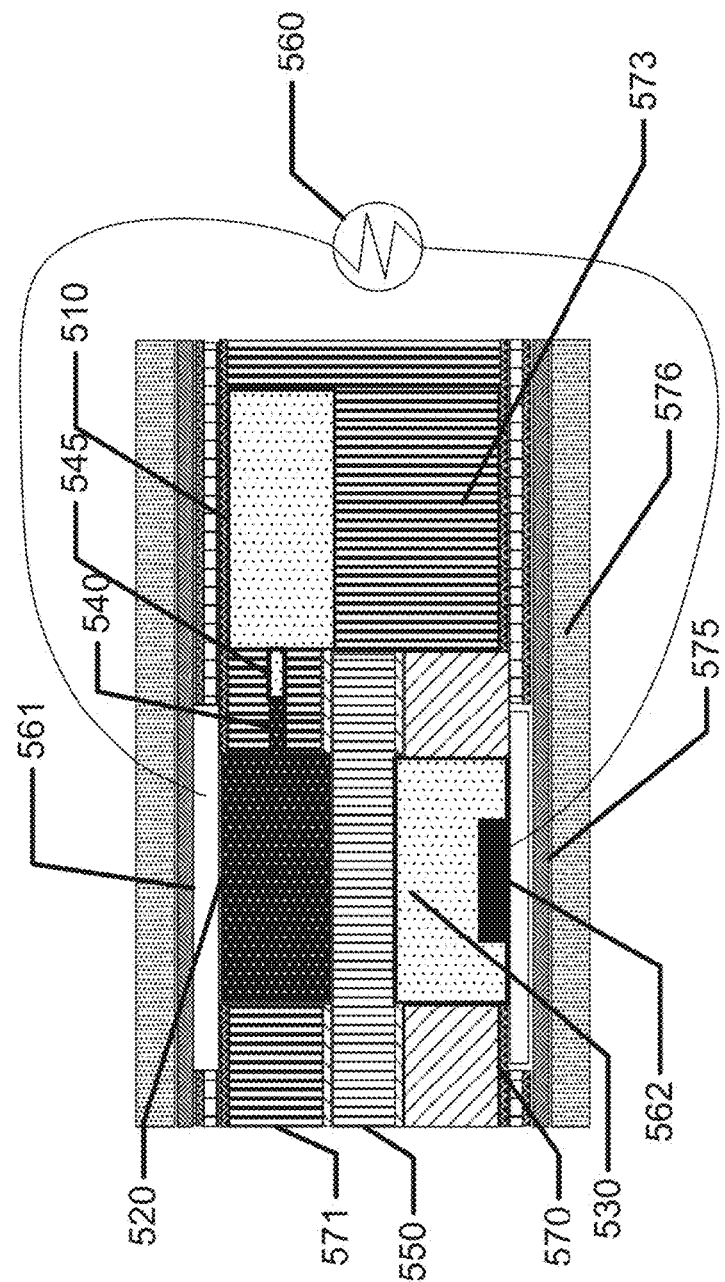

In a fuel cell, it may be particularly important for the diffusion of molecular species to be regulated within the device. The electrolyte may play a key function in preventing reactants from crossing between the anode and cathode while also allowing hydrogen ions to diffuse through the cell to complete the electrochemical circuit. Other parts of the construction reaction process have similar important functions. The adhesives, 570 may be an example where diffusion control and material choice may be important, and the seals formed at the adhesive layers may have supplemental sealing such as laser based melt flow sealing as examples. The laminate material such as layer 571 may be another example, where materials that are non-permeable are desirable. In one example, a supplemental laminate piece 572 may be found which may add a non-permeable characteristic between the electrolyte 550 and the fuel source cavity 510. Referring to FIG. 5B the volume of the fuel cavity may be altered with an impervious layer 573 which may be used to isolate the fuel from the membrane/electrolyte region.

There may be other species such as oxygen that should be controlled to be present only in the cathode cavity 530. The various layers may be formed to be impermeable to oxygen to support this function. Alternatively, there are regions of the fuel cell that should be permeable to oxygen since it is used in the reaction process in the fuel cell. The anode electrode itself may have perforations or gaps that allow for gasses to diffuse into the cathode cell. Other structures such as electrical interconnects 575 and support layers 576 may also be designed to have permeability to oxygen. As the fuel source reacts in the fuel cell, oxygen is consumed in the cathode cell while carbon dioxide may be evolved in the anode cell. In some examples, the carbon dioxide may be evolved and diffuse out of the cell, or in other examples, the carbon dioxide may be dissolved in the reactant solution with buffers present to limit the change in pH that occurs as carbon dioxide is solvated.

In some examples, an oxidant source may be incorporated within the cathode solution even when the various regions are kept from allowing diffusion of molecules such as oxygen across boundaries. General zeolites formed to absorb oxygen or nanotubes may be configured to adsorb oxygen molecules and surrender them during an oxidation reaction. In a similar vein, adsorbant surfaces of zeolytes may be used to segregate carbon dioxide formed in the anode during the course of the generation of electricity in a fuel cell.

Figure 6B:
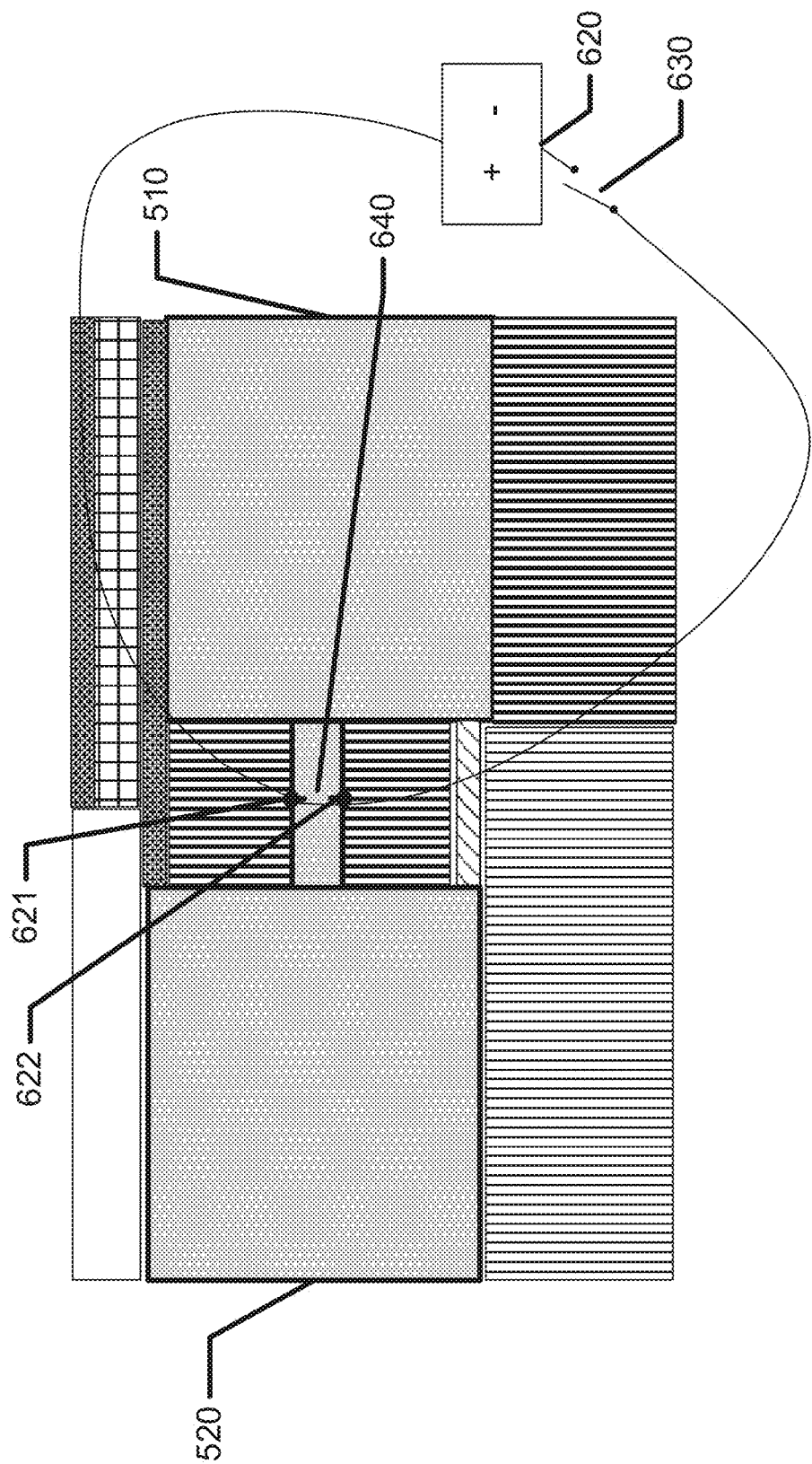

There may be numerous active species that have a useful function in the examples of fuel cells discussed. Since a powered device may need to be stored over a relatively long shelf life, there may be important considerations that may stabilize the components of biocompatible fuel cells such as the variety of enzymes which may be connected to electrode surfaces. One important consideration may be the segregation of a fuel source from the anode cell until such a time that energy derived from it is used. Referring now to FIGS. 6A and 6B, a fuel cell activation element may be depicted. The fuel source cavity 510 may contain the fuel source for the fuel cell's operation, which may include maltodextrin, glucose or other biofuels, as non-limiting examples. In some examples, the fuel source may be an aqueous solution of maltodextrin, glucose or other biofuels. In other examples, a solid or highly concentrated solution of the fuel may be stored in the fuel cavity. A closed gate 610 may prevent the fuel source from transferring from the fuel source cavity 510 into the anode cavity 520. As a non-limiting example, this gate 610 which is closed may consist of an electrically conductive metal sheet. In other examples, the gate may be an electrically controlled expansive element that may be programmed to open and close multiple times, to allow fuel to move from the fuel cavity to the anode cavity. A separate power source 620, which may include a cavity-formed battery as described in the referenced related applications of the present disclosure, may be connected to the closed gate 610 at connection points 621, 622 to create a circuit that may be connected or broken by means of an electrical switch 630. The operating voltage of the separate power source 620 may be high enough that when the electrical switch 630 is connected to complete the circuit, the voltage across the closed gate 610 may very quickly increase power enough to melt the thin film like an electric fuse. Thus in some examples, the current flow may cause the closed gate 610 to rupture, resulting in an open gate 640 as depicted in FIG. 6B. When this occurs, the fuel source in the fuel source cavity 510 may now transfer to the anode cavity 520. Thus, an activation signal may be received by electronic circuitry powered by a small battery cell. The battery cell's capacity may be based on that needed to support a receiver of the activation signal and the energy required to rupture the seal in the fuel cell fuel source cavity at the closed gate 610. In some example, the battery may have a small additional energy capacity to operate the biomedical device for a period of time while the fuel cell initiates. In some examples, the materials that comprise a fuel cell may be more biologically compatible than battery chemistry and in those cases, the use of a fuel cell based energization element of this composite design may maximize the usage of biocompatible materials in the fuel cell.

Figure 7:
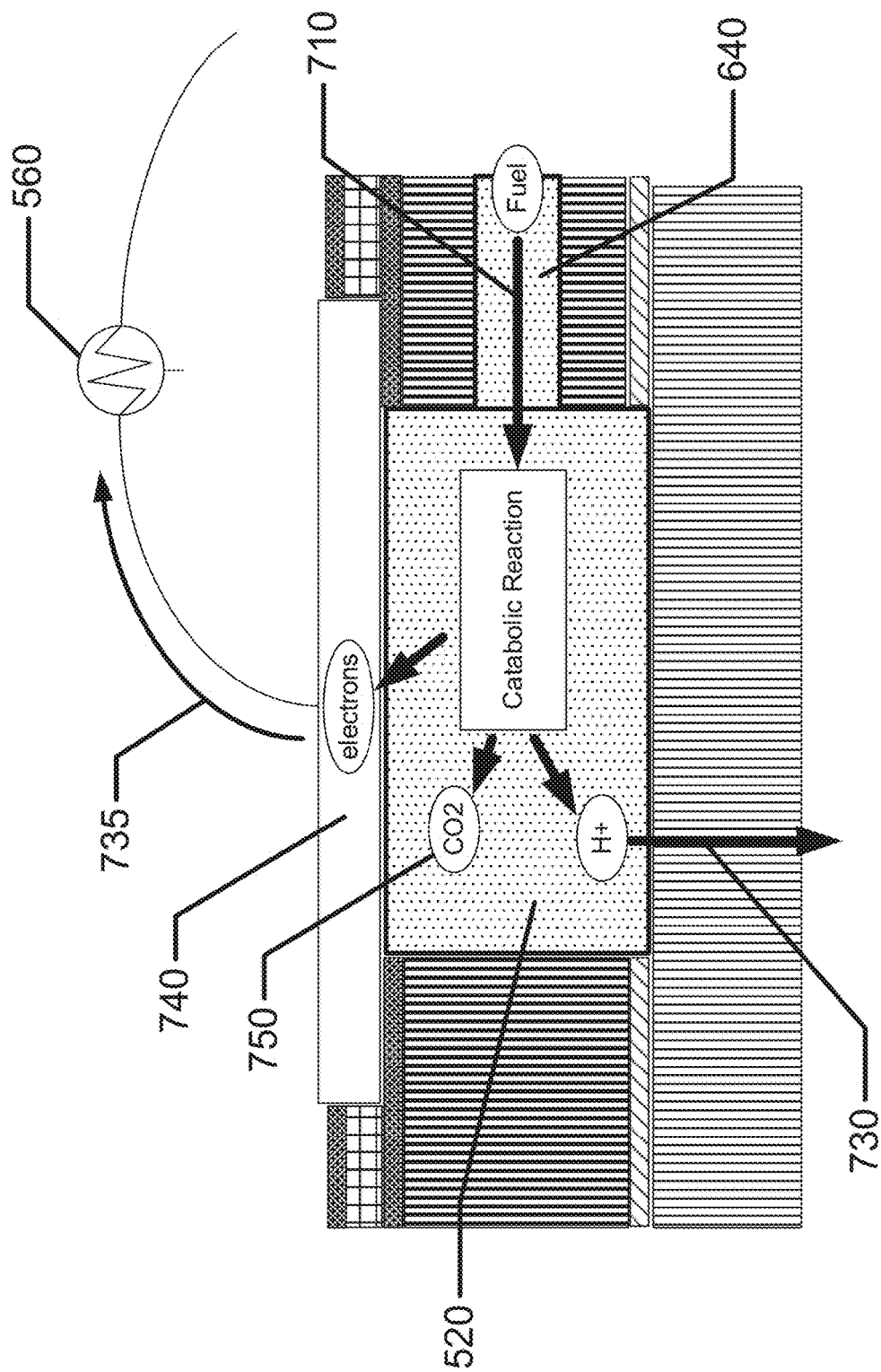
FIG. 7 illustrates a close-up view of the anode region and fuel store region of exemplary cavity based fuel cells.

Referring now to FIG. 7, an exemplary active anode cavity may be seen. With an open gate 640 between the fuel source cavity 510, not found in FIG. 7 but as referenced in FIG. 5A, and anode cavity 520, the fuel source may be able to travel in the direction indicated by arrow 710 into the anode cavity 520. The active anode cavity may contain a combination of ingredients including a buffer solution to maintain a stable pH of the solution, a single or possible combination of reaction catalysts, and specific concentrations of other ingredients that may react with the fuel source when it is exposed to these ingredients. The reaction catalysts may consist of a single or combination of specific enzymes, to function as reaction catalysts in a desired catabolic reaction with a biofuel, such as, but not limited to, maltodextrin or other glucose molecules. This catabolic reaction may generate a number of free protons, which may travel in the direction indicated by arrow 730 across the membrane (also called an electrolyte in previous discussions) into the cathode cavity 530, which is depicted in following FIG. 8, as well as an equal number of free electrons, which may travel in the direction indicated by arrow 735 through an external circuit 560 to the cathode as well. Depending on the specific catabolic reaction taking place in the active anode cavity it may be desirable for the active anode cavity to be oxygen-impermeable. To achieve this, the outer anode boundary 740, which may be an electrical interconnect, may be composed of an oxygen-impermeable material, such as a metal, as a non-limiting example. In some examples, films of brass, titanium, aluminum and metals like this may be used. For certain types of fuel source the catabolic oxidation reactions may produce carbon dioxide as a byproduct 750. Since the anode cavity may be designed to not allow oxygen to diffuse into the cavity, this same impervious active anode cavity may not be able to dispel generated carbon dioxide. In some examples the carbon dioxide as generated may be dissolved in the aqueous solution of the anode. In dissolving, the carbon dioxide may alter the pH of the ingredient solution present in the active anode cavity. Thus, a buffering solution may be useful in the solution to increase the amount of carbon dioxide that may be evolved before the pH of the anode lowers enough to effect the reactions. Thus, buffers may be introduced to keep the pH within operational levels.

Figure 8:
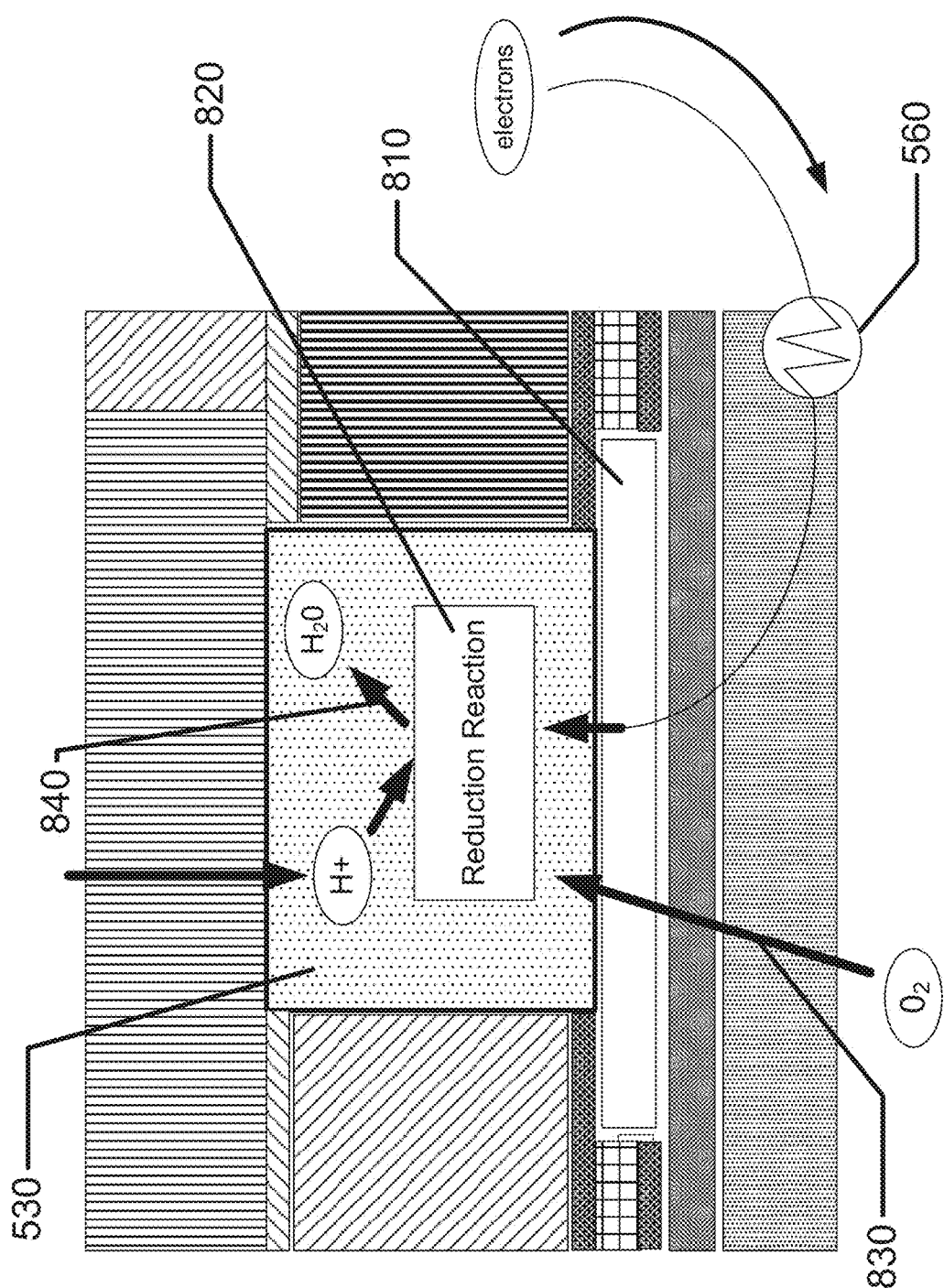
FIG. 8 illustrates a close-up view of the cathode region of exemplary cavity based fuel cells.

Referring now to FIG. 8, an active cathode cavity may be seen. This active cathode cavity may contain an electrically conductive electrode 810 that may serve as the site for the reduction reaction 820 present in the cathode. This reduction reaction 820 may be caused by an influx of protons and electrons from the anode cavity. In order for the reduction reaction 820 to occur, oxygen may be introduced into the active cathode cavity from the environment 830; as such, the cathode cavity 530 may be constructed with oxygen-permeable materials including, but not limited to, a hydrogel. As a product of the reduction reaction 820 in the active cathode cavity, water may be generated 840. In some examples, it may be desirable to design a fuel cell of the types discussed herein such that the cathode region is located within a biomedical device such that it is in a proximity to a source of oxygen. In a non-limiting example, a contact lens may have an "outer curve" surface and an "inner curve" surface. The inner curve surface may rest upon or in closest proximity to the surface of the eye. The "outer curve" may therefore sit facing the atmosphere surrounding the ocular environment. Even though the lens surface may still be bathed in tear fluid during use, there may be an expectation that the oxygen concentration in proximity to atmosphere is relatively higher.

If the biomedical device is packaged in a container that keeps the biomedical device in an environment devoid of oxygen, it may be possible to suspend the operation of the fuel cell. In the absence of oxygen, the reactions will ultimately stop. Therefore, in examples of this type, the opening of a package may allow oxygen from the atmosphere to flood into the biomedical device and diffuse into the fuel cell. As the oxygen diffuses into the fuel cell it may begin to generate electrical current as its fuel source is consumed. Thus, another type of activation may result from such an example. In the example of FIG. 8, electrons flow into the cathode cell and are illustrated by the arrow pointing towards the electrical load 560. After flowing through the electrical load 560, electrons enter into the cathode through conductive electrode 810 and then participate in the reduction reaction 820.

Referring now to FIG. 9, an exemplary combination of cavity-based fuel cells may be seen. Depending on the device that may be powered by the combination of cavity fuel cells, it may be desirable to supply the device with a greater voltage or current than may be supplied by just a single cavity fuel cell. As such, multiple cavity-based fuel cells may be connected in parallel 910 as shown in FIG. 9A to increase the supplied current. In another example, a combination may be formed to increase the supplied voltage, such as in series 920 as shown in FIG. 9B. Many different series and parallel combinations 930, in FIG. 9C, of cavity based fuel cells may be possible to achieve a resulting supply voltage and current. The laminate cavity based approach may result in a straight forward manner to define multiple fuel cell examples in a small volume that may be combined in an equally straight forward manner. Additionally, to increase the overall life of a device powered by cavity fuel cells, this exemplary combination of cavity fuel cells may contain, as a non-limiting example, cavity fuel cells that are activated immediately upon powering on the device, as well as cavity fuel cells that are activated at a later moment. Because cavity based fuel cells may have a finite lifespan, limited by a finite fuel source or degradation of active components, as non-limiting examples, the lifespan of a device powered by these cavity fuel cells, may be limited to the lifespan of the cavity fuel cells. If however, multiple groups of fuel cells, each having the ability to power the device alone, are powered on in succession, the life span of the device may be doubled, tripled, or increased by a larger amount, depending on how many of these such groups are utilized. The activation of subsequent cavity fuel cell groups may be triggered, for example, by control circuitry that measures the loaded voltage dropping below a certain value, as a non-limiting example.

Fuel cells may be designed and incorporated into numerous types of biomedical devices. In some examples, fuel cells based on cavity based architectures may result in desirable solutions. The biomedical devices may be, for example, implantable electronic devices, such as pacemakers and micro-energy harvesters, electronic pills for monitoring and/or testing a biological function, surgical devices with active components, ophthalmic devices, microsized pumps, defibrillators, stents, and the like.

Specific examples have been described to illustrate embodiments for the formation, methods of formation, and apparatus of formation of biocompatible energization elements comprising fuel cells. These examples are for said illustration and are not intended to limit the scope of the claims in any manner. Accordingly, the description is intended to embrace all embodiments that may be apparent to those skilled in the art.

What is claimed is:

1. A biocompatible energization element comprising
an anode spacer layer;
a first hole located in the anode spacer layer;
a cathode spacer layer;
at least a second hole, wherein the second hole is located in the cathode spacer layer, wherein the second hole is aligned to the first hole, and wherein the second hole is larger than the first hole such that when the first hole and the second hole are aligned there is a ridge of anode spacer layer exposed in the second hole;
a membrane layer, wherein the membrane layer is placed within the second hole and is adhered to the ridge of anode spacer layer;
a first cavity between sides of the first hole and a first surface of the membrane layer, wherein the first cavity is filled with an anode solution;
a second cavity between sides of the second hole and a second surface of the membrane layer, wherein the second cavity is filled with a cathode solution; and
a third cavity wherein the third cavity is filled with a fuel solution and wherein a channel connects the third cavity to the first cavity.

2. The biocompatible energization element according to claim 1 wherein the anode solution comprises a first enzyme.

3. The biocompatible energization element according to claim 2 wherein the anode solution comprises glucose-6-phosphate dehydrogenase.

4. The biocompatible energization element according to claim 2 wherein the anode solution comprises α-glucan phosphorylase.

5. The biocompatible energization element according to claim 2 wherein the anode solution comprises phosphoglucomutase.

6. The biocompatible energization element according to claim 2 wherein the anode solution comprises 6-phosphogluconate dehydrogenase.

7. The biocompatible energization element of claim 3 wherein the biocompatible energization element is electrically connected to an electroactive element within a biomedical device.

8. The biocompatible energization element of claim 1 wherein the biocompatible energization element is electrically connected to an electroactive element within a biomedical device.

9. The biocompatible energization element of claim 7 wherein the biomedical device is an ophthalmic device.

10. The biocompatible energization element of claim 9 wherein the ophthalmic device is a contact lens.

11. The biocompatible energization element according to claim 10 further comprising maltodextrin.

12. The biocompatible energization element according to claim 10 further comprising glucose.

13. The biocompatible energization element according to claim 1 additionally comprising a seal between the anode spacer layer and the cathode spacer layer, wherein the seal also comprises any layers between the anode spacer layer and the cathode spacer layer.

14. The biocompatible energization element according to claim 13 wherein the seal is formed by laser welding.

15. The biocompatible energization element according to claim 13 wherein the seal is formed by ultrasonic welding.

16. The biocompatible energization element according to claim 13 wherein the seal is formed by photo-patterning of polymer seals.

17. A biocompatible energization element comprising:
an anode spacer layer;
a first hole located in the anode spacer layer;
a cathode spacer layer;

at least a second hole, wherein the second hole is located in the cathode spacer layer, wherein the second hole is aligned to the first hole, and wherein the second hole is larger than the first hole such that when the first hole and the second hole are aligned there is a ridge of anode spacer layer exposed in the second hole;

a membrane layer, wherein the membrane layer is placed within the second hole and is adhered to the ridge of anode spacer layer;

a first cavity between sides of the first hole and a first surface of the membrane layer, wherein the first cavity is filled with an anode solution;

a second cavity between sides of the second hole and a second surface of the membrane layer, wherein the second cavity is filled with a cathode solution;

a third cavity wherein the third cavity is filled with a fuel solution and wherein a channel connects the third cavity to the first cavity; and an electrically actuated channel blocking mechanism, wherein the channel blocking mechanism blocks the channel connecting the third cavity to the first cavity, and wherein the electrical actuation allows fuel to flow from the third cavity into the first cavity.

18. The biocompatible energization element according to claim 17 wherein the anode solution comprises a first enzyme.

19. The biocompatible energization element according to claim 18 wherein the anode solution comprises glucose-6-phosphate dehydrogenase.

20. The biocompatible energization element according to claim 18 wherein the anode solution comprises α-glucan phosphorylase.

21. The biocompatible energization element according to claim 18 wherein the anode solution comprises phosphoglucomutase.

22. The biocompatible energization element according to claim 18 wherein the anode solution comprises 6-phosphogluconate dehydrogenase.

23. The biocompatible energization element of claim 19 wherein the biocompatible energization element is electrically connected to an electroactive element within a biomedical device.

24. The biocompatible energization element of claim 17 wherein the biocompatible energization element is electrically connected to an electroactive element within a biomedical device.

25. The biocompatible energization element of claim 24 wherein the biomedical device is an ophthalmic device.

26. The biocompatible energization element of claim 25 wherein the ophthalmic device is a contact lens.

27. The biocompatible energization element according to claim 24 further comprising maltodextrin.

28. The biocompatible energization element according to claim 24 further comprising glucose.

29. The biocompatible energization element according to claim 17 additionally comprising a seal between the anode spacer layer and the cathode spacer layer, wherein the seal also comprises any layers between the anode spacer layer and the cathode spacer layer.

30. The biocompatible energization element according to claim 29 wherein the seal is formed by laser welding.

31. The biocompatible energization element according to claim 29 wherein the seal is formed by ultrasonic welding.

32. The biocompatible energization element according to claim 29 wherein the seal is formed by photo-patterning of polymer seals.

33. The biocompatible energization element according to claim 17 further comprising a battery cell.

34. The biocompatible energization element according to claim 33 wherein the battery cell provides energy for the electrical actuation.

* * * * *